United States Patent
Satou

(10) Patent No.: US 7,839,300 B2
(45) Date of Patent: Nov. 23, 2010

(54) RFID READING SYSTEM, RFID READING METHOD, RFID READER, RFID READ CONTROLLING APPARATUS, RFID READER CONTROL PROGRAM, COMPUTER-READABLE INFORMATION RECORDING MEDIUM HAVING RECORDED THE SAME, CONTROL PROGRAM FOR RFID READ CONTROL APPARATUS, AND COMPUTER-READABLE INFORMATION RECORDING MEDIUM HAVING RECORDED THE SAME

(75) Inventor: Tadashi Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 1313 days.

(21) Appl. No.: 11/336,715

(22) Filed: Jan. 19, 2006

(65) Prior Publication Data
US 2006/0158313 A1 Jul. 20, 2006

(30) Foreign Application Priority Data
Jan. 19, 2005 (JP) .............................. 2005-011569

(51) Int. Cl.
*G08C 19/00* (2006.01)
(52) U.S. Cl. .............................. 340/825.69; 340/10.34; 340/10.33
(58) Field of Classification Search ............ 340/825.69, 340/825.72, 10.1, 10.34, 10.33, 572.1, 505
See application file for complete search history.

(56) References Cited

U.S. PATENT DOCUMENTS

| | | | | |
|---|---|---|---|---|
| 5,455,575 A | * | 10/1995 | Schuermann | ................. 342/42 |
| 5,850,187 A | * | 12/1998 | Carrender et al. | ........... 340/10.6 |
| 6,674,359 B1 | * | 1/2004 | Aslanidis et al. | ......... 340/10.31 |
| 7,283,037 B2 | * | 10/2007 | Diorio et al. | ............. 340/10.51 |
| 7,345,587 B2 | * | 3/2008 | Bremer | ..................... 340/572.7 |
| 7,420,458 B1 | * | 9/2008 | Kuzma et al. | ............ 340/10.34 |
| 2006/0114104 A1 | * | 6/2006 | Scaramozzino | ............ 340/10.2 |

FOREIGN PATENT DOCUMENTS

| | | |
|---|---|---|
| JP | 11-345294 | 12/1999 |
| JP | 2000-20651 | 1/2000 |
| JP | 2001-348111 | 12/2001 |
| JP | 2002-2917 | 1/2002 |
| JP | 2002-60021 | 2/2002 |
| JP | 2003-150916 | 5/2003 |

* cited by examiner

*Primary Examiner*—Vernal U Brown
(74) *Attorney, Agent, or Firm*—Dickstein Shapiro LLP

(57) ABSTRACT

An RFID reading system includes at least two readers and at least one RF tag. Each reader includes a transmitter, a receiver, and a CPU section to control transmission of the transmitter and reception of the receiver. Both readers receive a reply signal sent from an RF tag in response to a query wave sent from either one of the readers to the RF tag. The readers obtain tag information from the RF tag based on the received signals. To prevent interference therebetween, when one of the readers sends a query wave, transmission of a query wave from the other one thereof is stopped for a predetermined period of time. The information can be read without causing interference between the readers. There are obtained an RFID reading system, an RFID reading method, and RFID reader and a control program thereof, an RFID read control device and a control program thereof, and a computer-readable information recording medium storing the control programs.

12 Claims, 36 Drawing Sheets

F I G. 17
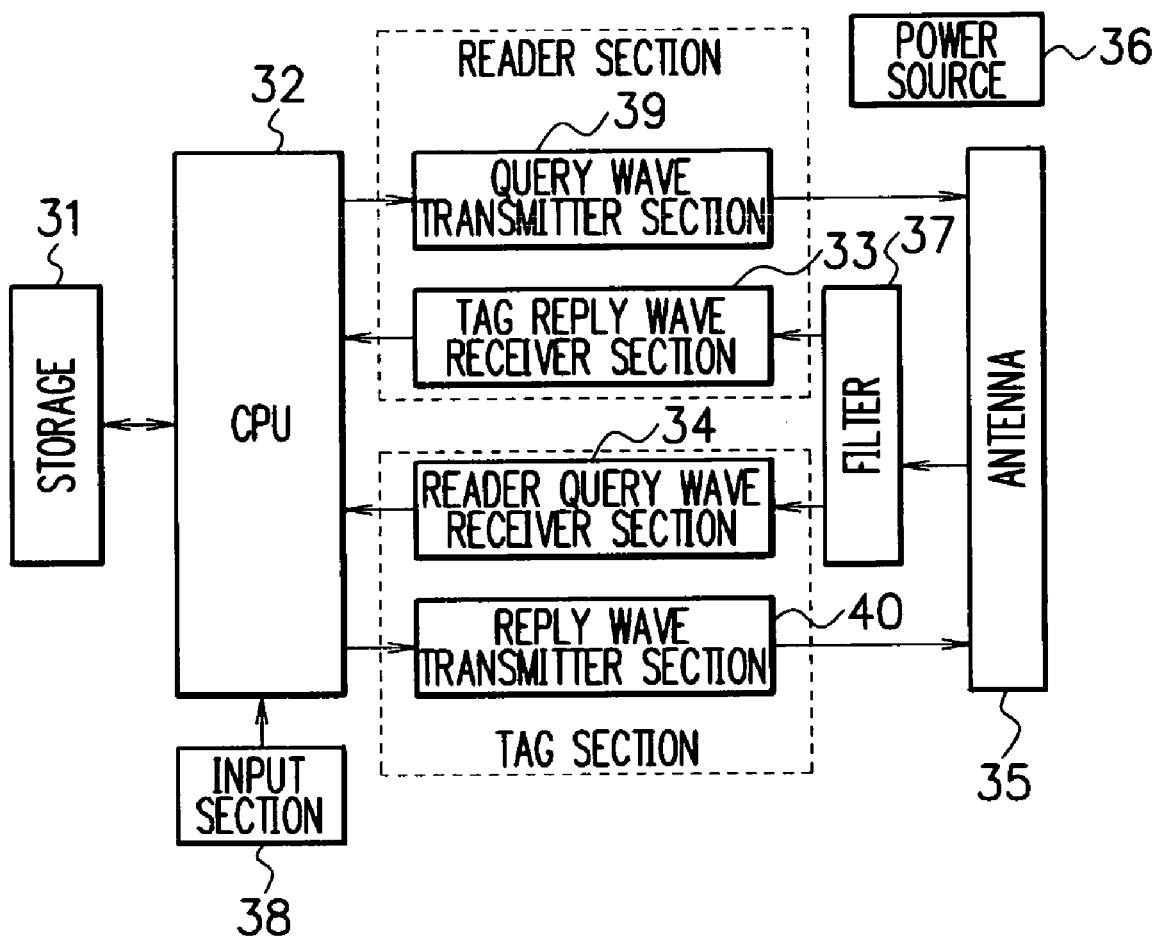

F I G. 19
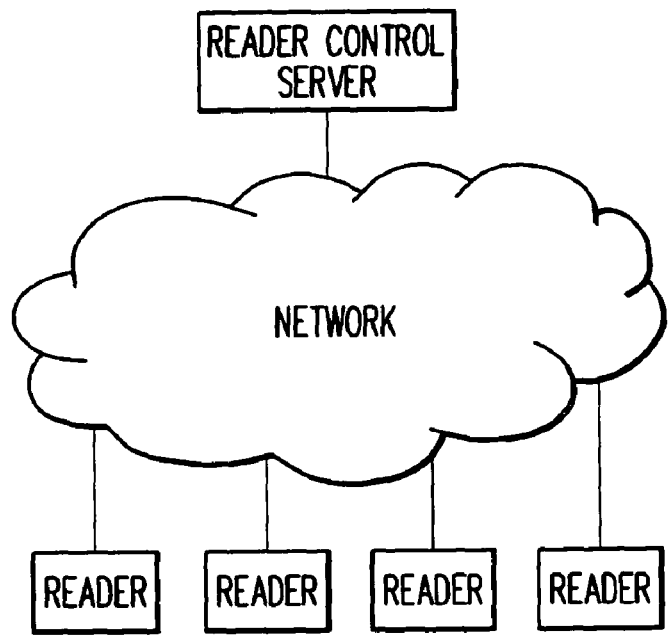
F I G. 20
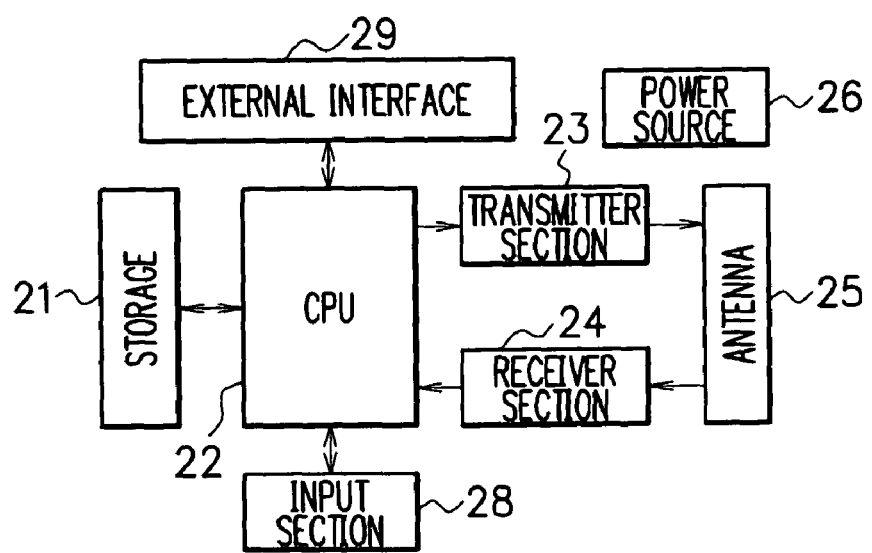

F I G. 21
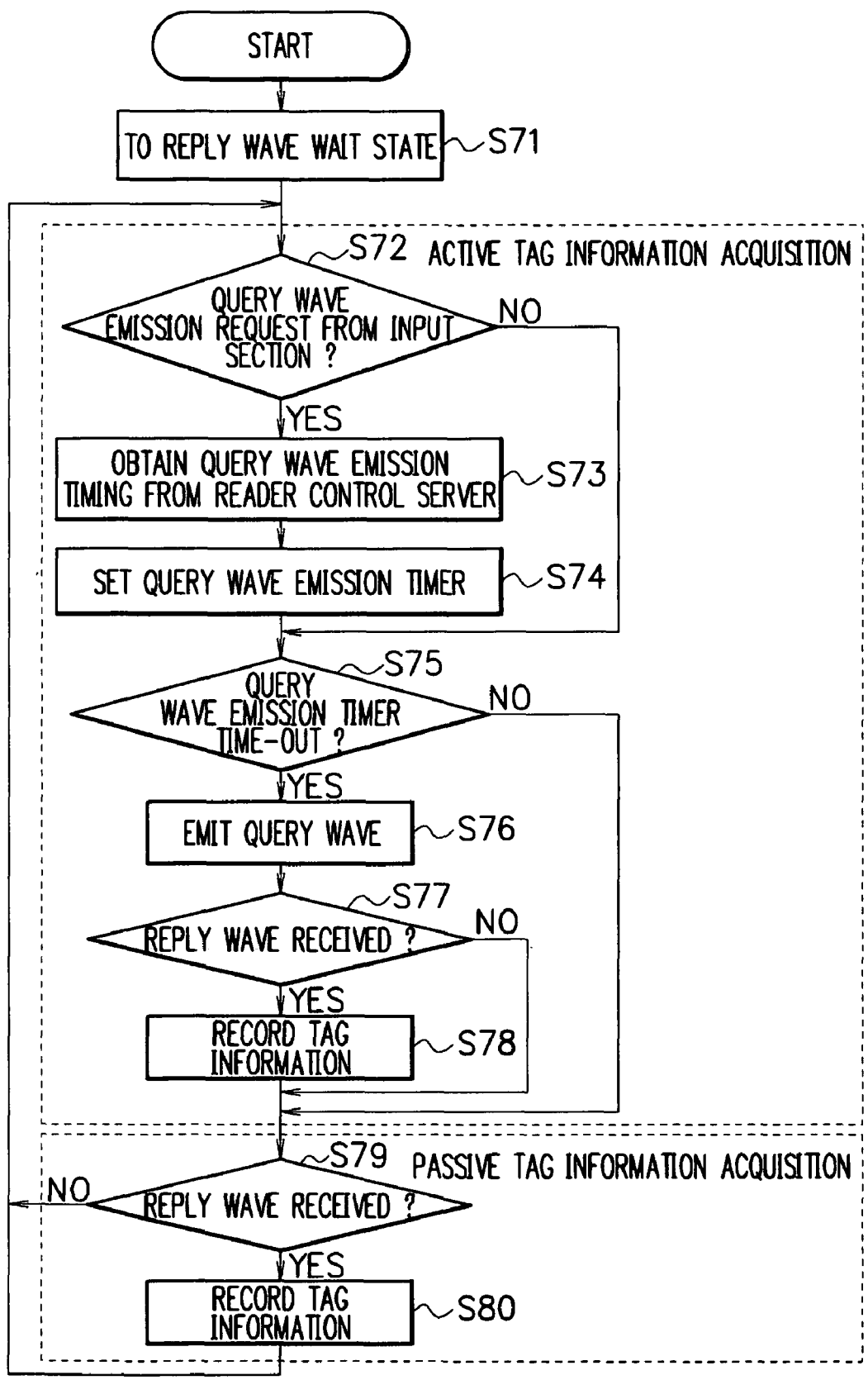

F I G. 22
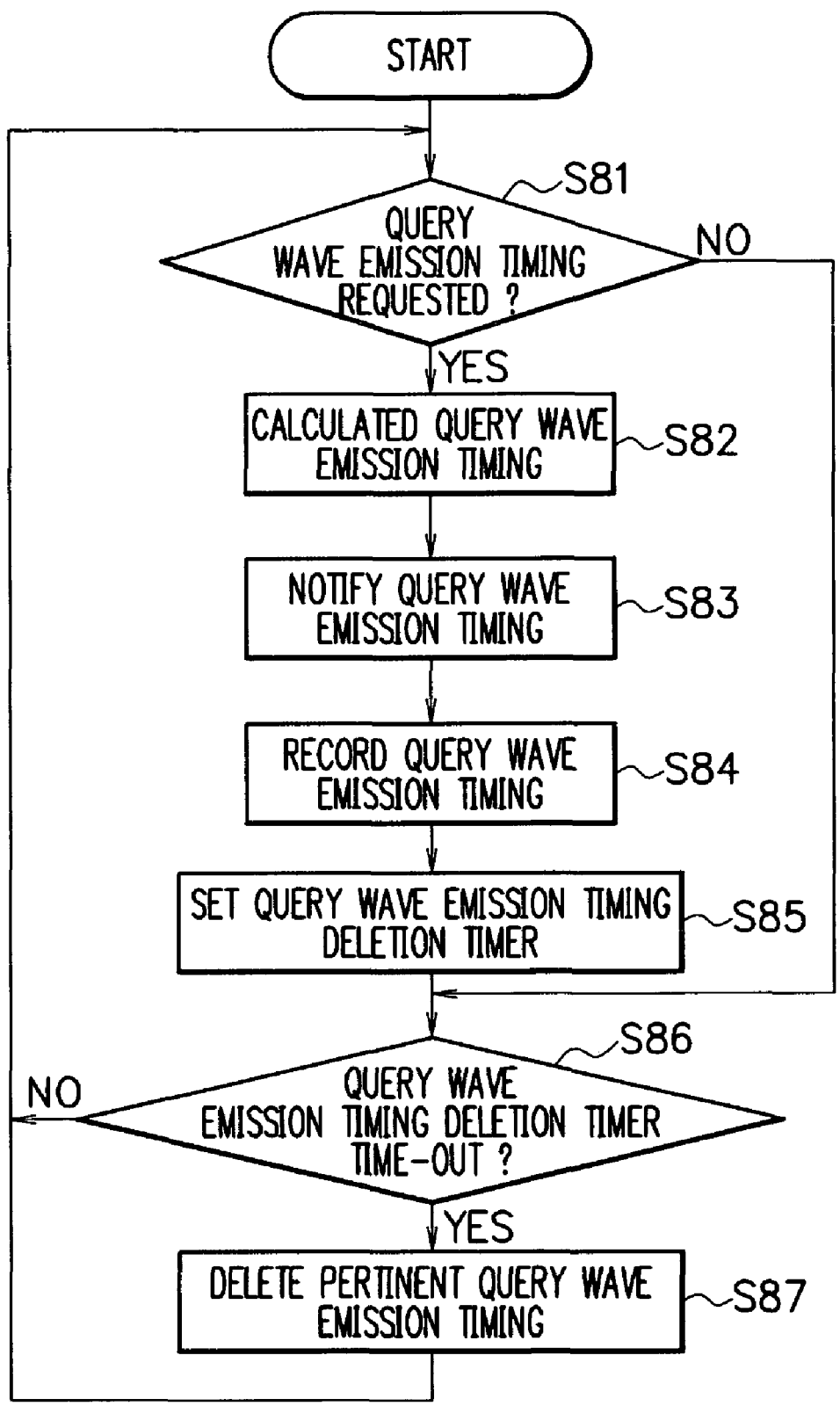

| ID | REFERENCE TIME [ms] | PERIOD [ms] |
|---|---|---|
| 101 | 100 | 1000 |
| 102 | 250 | 3000 |
| 103 | 900 | 1500 |
| 202 | 350 | |

| ID | REFERENCE TIME [ms] | PERIOD [ms] |
|---|---|---|
| 101 | 100 | 1000 |
| 102 | 250 | 3000 |
| 103 | 900 | 1500 |
| 202 | 350 | |
| 201 | 450 | |

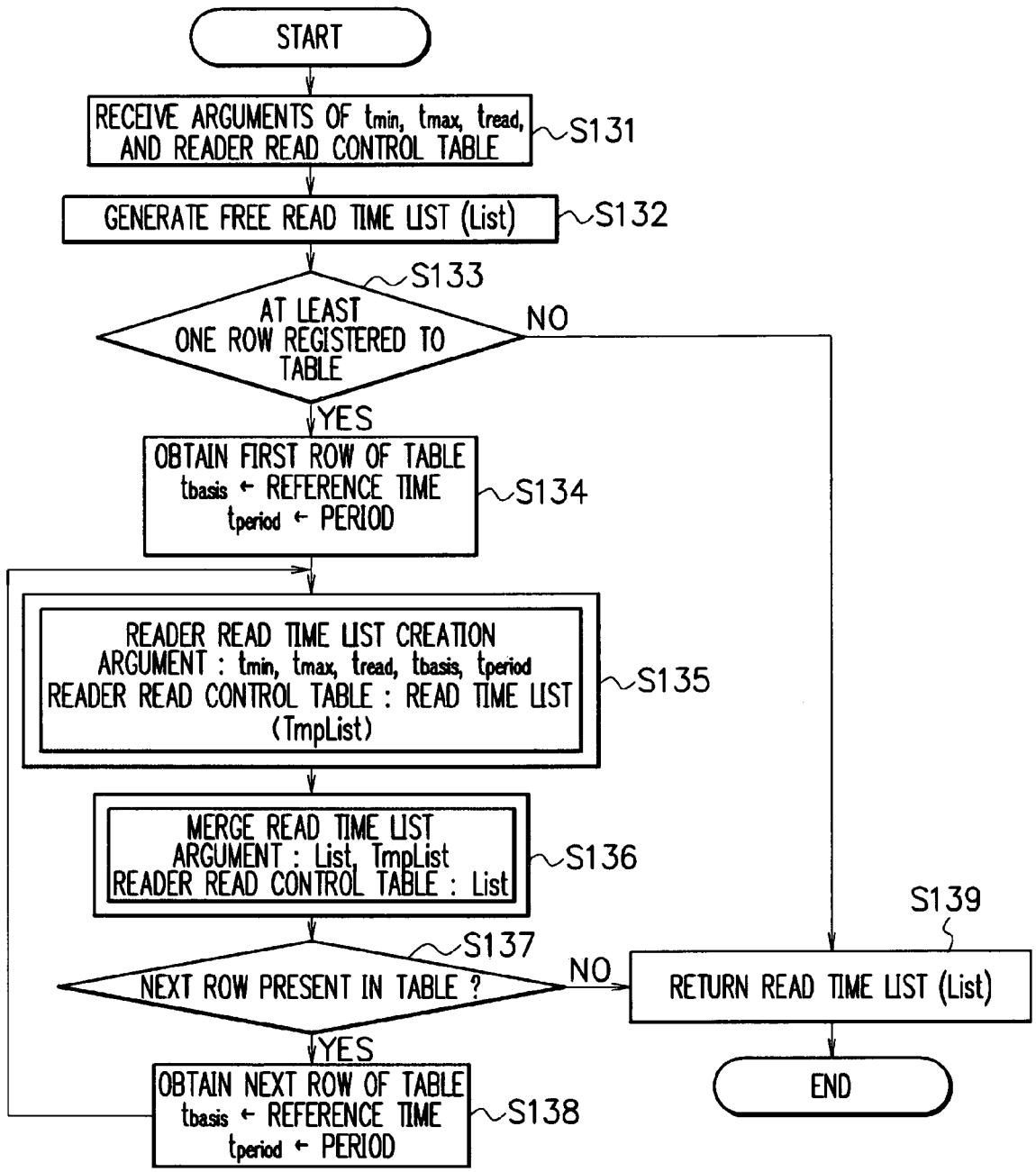

F I G. 33

| READ START TIME [ms] | READ END TIME [ms] |
|---|---|
| 300 | 400 |
| 600 | 700 |
| 900 | 1000 |

F I G. 34

| READ START TIME [ms] | READ END TIME [ms] |
|---|---|
| 300 | 400 |
| 450 | 700 |
| 800 | 1230 |

F I G. 36
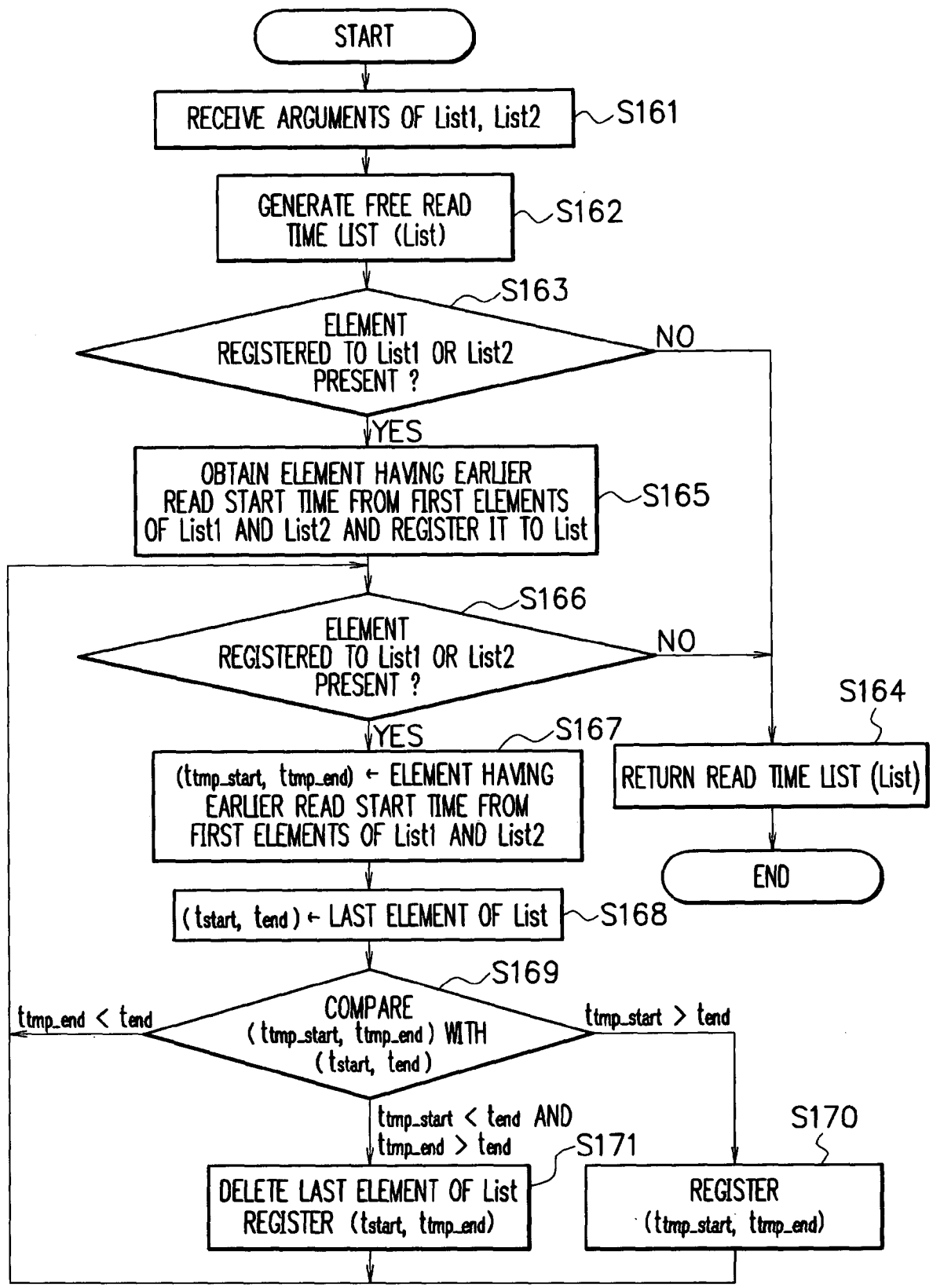

| ID | REFERENCE TIME [ms] | PERIOD [ms] |
|---|---|---|
| 101 | 50 | 1000 |
| 102 | 200 | 3000 |
| 103 | 300 | 1500 |
| 202 | 350 | |

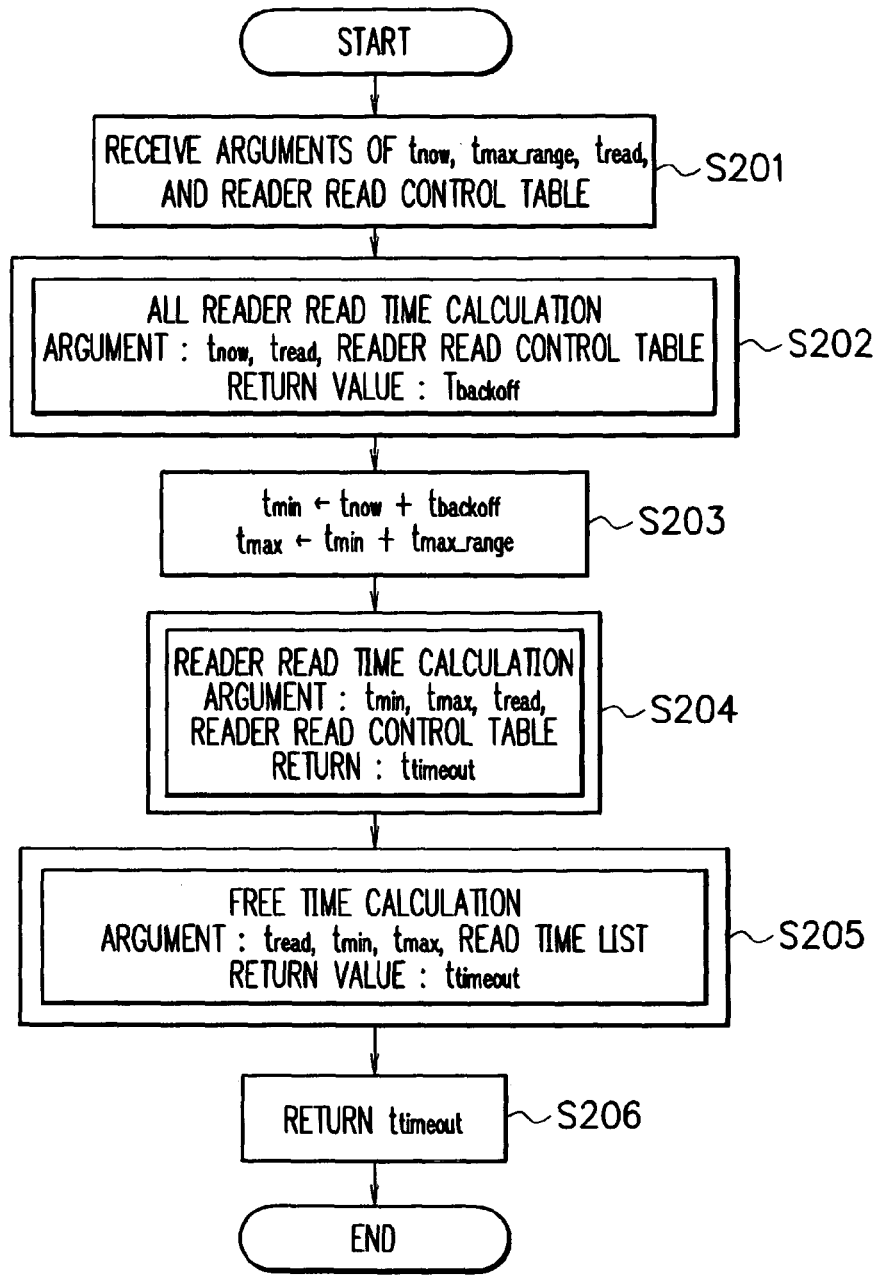

F I G. 45

| ID | REFERENCE TIME [ms] | PERIOD [ms] | CHANNEL |
|---|---|---|---|
| 101 | 100 | 500 | 3 |
| 102 | 300 | 2000 | 2 |
| 103 | 700 | 1500 | 1 |
| 104 | 200 | 2000 | 1 |
| 105 | 200 | 1000 | 2 |
| 202 | 250 |  | 3 |

| ID | REFERENCE TIME [ms] | PERIOD [ms] |
|---|---|---|
| 103 | 700 | 1500 |
| 104 | 200 | 2000 |

| ID | REFERENCE TIME [ms] | PERIOD [ms] | READER TYPE | CHANNEL |
|---|---|---|---|---|
| 101 | 100 | 500 | FIXED TYPE | 3 |
| 102 | 300 | 2000 | FIXED TYPE | 2 |
| 103 | 700 | 1500 | FIXED TYPE | 1 |
| 104 | 200 | 2000 | FIXED TYPE | 1 |
| 105 | 200 | 1000 | FIXED TYPE | 2 |
| 202 | 250 | | MOBILE TYPE | 3 |

CHANNEL 1 : ☐
CHANNEL 2 : ▦
CHANNEL 3 : ▨

F I G. 52
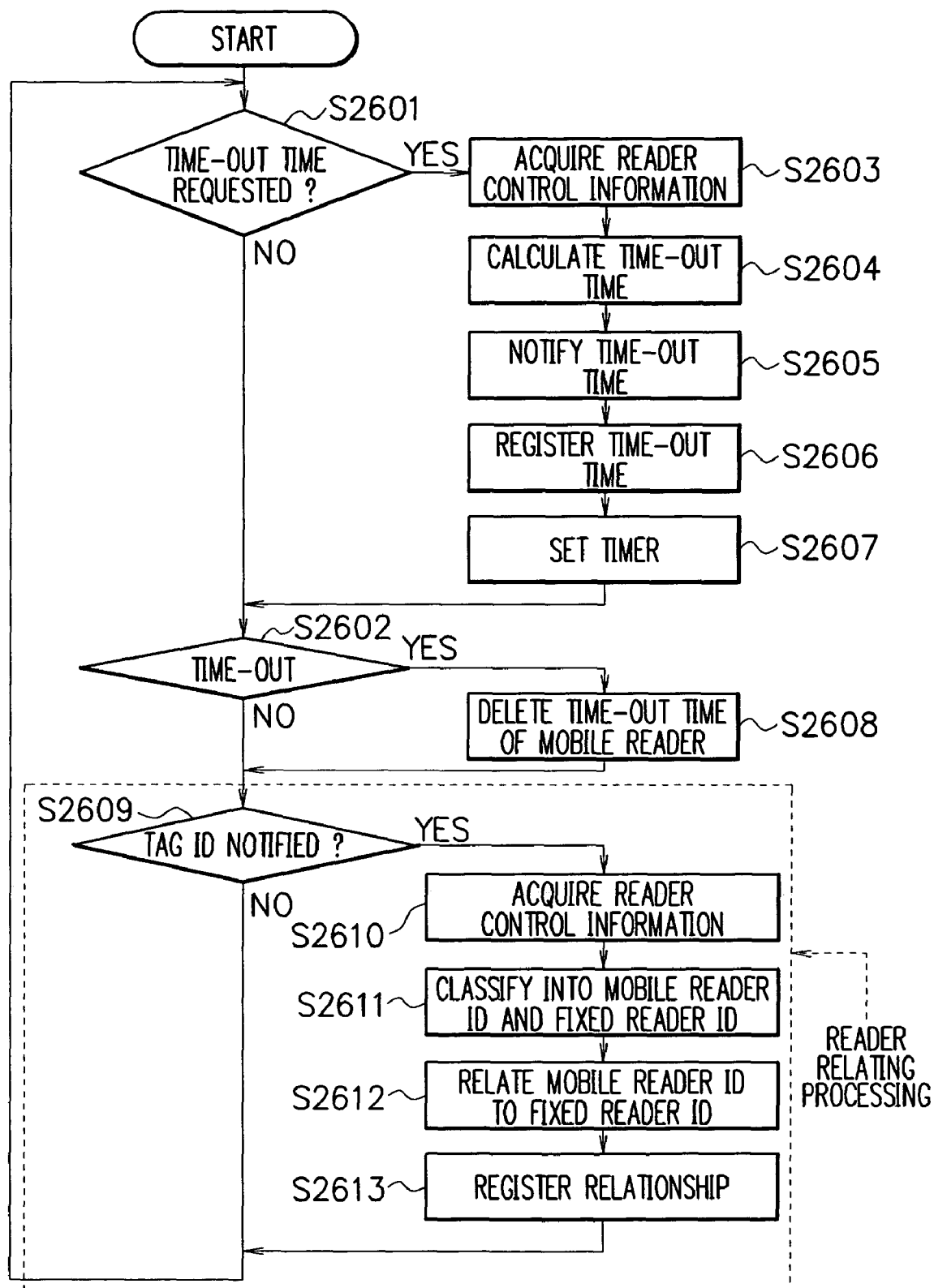

FIG. 53

| ID | READER TYPE | REFERENCE TIME | PERIOD | NEARBY MOBILE READER |
|---|---|---|---|---|
| 101 | FIXED TYPE | 100 | 1000 | |
| 102 | FIXED TYPE | 250 | 3000 | |
| 103 | FIXED TYPE | 900 | 1500 | |
| 104 | FIXED TYPE | 350 | 1000 | |
| 201 | MOBILE TYPE | 500 | | |
| 202 | MOBILE TYPE | | | |
| 203 | MOBILE TYPE | | | |

FIG. 54

| ID | READER TYPE | REFERENCE TIME | PERIOD | NEARBY MOBILE READER |
|---|---|---|---|---|
| 101 | FIXED TYPE | 100 | 1000 | |
| 102 | FIXED TYPE | 250 | 3000 | 202 |
| 103 | FIXED TYPE | 900 | 1500 | |
| 104 | FIXED TYPE | 350 | 1000 | |
| 201 | MOBILE TYPE | 500 | | |
| 202 | MOBILE TYPE | | | |
| 203 | MOBILE TYPE | | | |

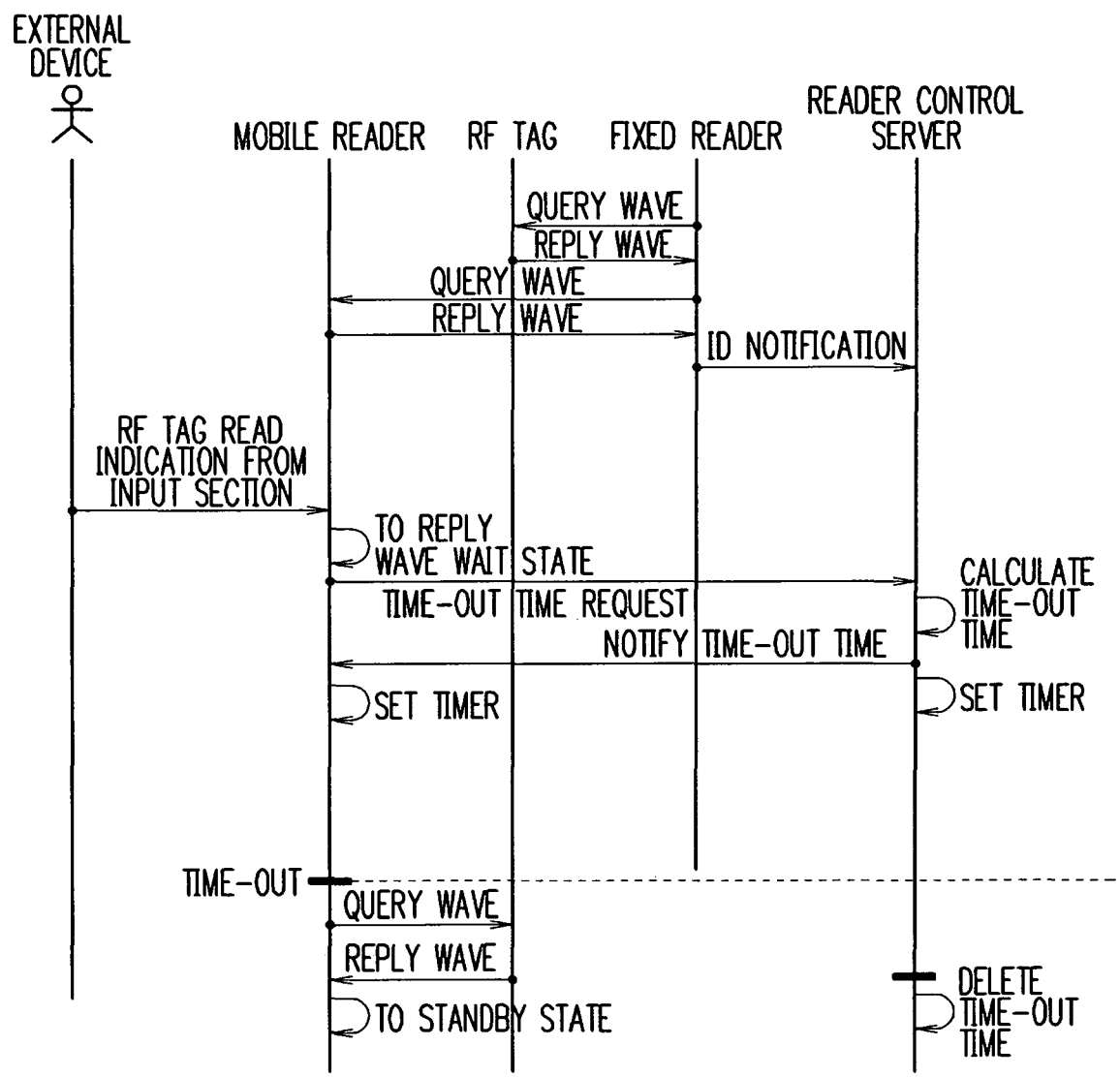
F I G. 55

RFID READING SYSTEM, RFID READING METHOD, RFID READER, RFID READ CONTROLLING APPARATUS, RFID READER CONTROL PROGRAM, COMPUTER-READABLE INFORMATION RECORDING MEDIUM HAVING RECORDED THE SAME, CONTROL PROGRAM FOR RFID READ CONTROL APPARATUS, AND COMPUTER-READABLE INFORMATION RECORDING MEDIUM HAVING RECORDED THE SAME

BACKGROUND OF THE INVENTION

1. Field of the Invention

The present invention relates to a Radio Frequency IDentifier/IDentification (RFID) reading system, an RFID reading method, an RFID reader, an RFID read control apparatus, an RFID reader control program, a computer-readable information recording medium storing the RFID reader control program, a control program for an RFID read control apparatus, and a computer-readable information recording medium storing the control program for the RFID read control apparatus. In particular, the present invention relates to an RFID reading system, an RFID reading method, an RFID reader, an RFID read control apparatus, an RFID reader control program, a computer-readable information recording medium storing the RFID reader control program, a control program for an RFID read control apparatus, and a computer-readable information recording medium storing the control program for the RFID read control apparatus, by which a predetermined reader emits a query wave, an RF tag emits a reply wave in response to the query wave, and a plurality of readers receives the reply wave such that the readers acquire information of the RF tag.

2. Description of the Prior Art

Recently, attention has been drawn to utilization of an RFID. One of the RFID applications is that RF tags are attached to items in a store so that the RF tags are read using a mobile reader to thereby provide information of items or merchandise information. There has been also proposed an RFID application in which a reader is installed on a display rack for merchandise management.

There exist conventional techniques regarding a tag information acquisition system and a tag information acquisition method as described in conjunction with prior art examples in the following paragraphs. In accordance with Japanese Patent Application Laid-Open No. 2002-60021, metallic electromagnetic shielding items are installed on lower surfaces of a plurality of shelves. According to Japanese Patent Application Laid-Open No. 2002-2917, loop antennas having mutually different characteristics are disposed in a plurality of merchandize management shelves which are adjacent to each other. Japanese Patent Application Laid-Open No. 2001-348111 has proposed a technique to control timing of supplying signals to antenna sections of a plurality of merchandize management shelves disposed adjacent to each other. In accordance with Japanese Patent Application Laid-Open No. Hei-11-345294, adjacent apparatuses such as readers and/or writers are arranged at positions at which signal phases are relatively inverted. These techniques have an object that a reply wave from an adjacent RF tag is correctly received.

However, according to a conventional tag information acquisition system adopting a plurality of readers, when a plurality of readers simultaneously emit query waves such that electromagnetic waves thereof interfere with each other, it is required to control the readers to prevent the interference so that the query waves are appropriately received.

To solve the problem, there have been proposed a method of preventing collision between radio waves. That is, a reader emits a query wave at timing at which the other readers do not emit a query wave. There is also proposed a method in which the readers use mutually different frequencies. A specific example of a technique to prevent radio wave collision is the method of preventing the collision between the fixed readers as described above. However, such technique is possible on the assumption that the reader is in a stand-still state, i.e., not moving. Therefore, if the technique is directly applied to a case including mobile readers, it will be difficult to sustain and to ensure the characteristic thereof.

Japanese Patent Application Laid-Open No. 2000-20651 describes a reader which operates with a variable communication frequency to thereby prevent collision between plural kinds of electromagnetic waves. However, there is no specific description of the procedure to determine a frequency for the operation. Additionally, timing at which the frequency is set to the reader has not been described. Although it is possible to apply a technique described in Japanese Patent Application Laid-Open No. 2003-150916 to the operation between mobile readers, there still remains a problem of interference among radio waves when a plurality of readers simultaneously emit query waves.

These techniques of the prior art are based on a restriction in which a reader desiring to acquire tag information emits a query wave and then receives a reply wave in response to the query wave to thereby acquire tag information. Consequently, some problems arise when these techniques are widely used as a system expands.

As above, when a fixed reader and a mobile reader attempt to read information from one associated module or device simultaneously, there occurs the interference. If readers are fixed, the interference can be avoided by beforehand placing the readers so as not to read the information at the same time. However, in the tag information acquisition systems of the prior art, in a situation in which mobile readers such as portable readers are employed, the interference between the readers cannot be predicted. This leads to a problem that the method in which timing to read information is beforehand set cannot be adopted.

SUMMARY OF THE INVENTION

It is therefore an object of the present invention to provide an RFID reading system, an RFID reading method, an RFID reader, an RFID read control apparatus, an RFID reader control program, a computer-readable information recording medium storing the RFID reader control program, a control program for an RFID read control apparatus, and a computer-readable information recording medium storing the RFID read control apparatus control program, where even there are used mobile readers, the interference can be prevented between the readers.

To achieve the object, in accordance with a first aspect of the present invention, there is provided an RFID reading system including RFID readers, a query wave transmitting unit for emitting a query wave signal and thereby requesting an RFID tag to transmit unique information. An RFID reader comprises a reply wave receiving means for receiving a reply wave signal including the unique information transmitted from the RFID tag in response to the query wave signal. In the system structure, the RFID reader favorably further includes a transmission wave emitting means for transmitting the query wave signal and a means for receiving a query wave signal emitted from another device. When the query wave signal from another device is received, it may be preferred to stop the transmission wave emitting means for a predetermined time.

In the first aspect, it is desirable that the RFID reader further includes a means for receiving the query wave signal emitted from another query wave transmitting device such that when the query wave signal emitted from another query wave transmitting device is received, the RFID reader activates the reply wave receiving means. Moreover, the RFID reader favorably further includes a query wave emitting means for transmitting the query wave signal. When the query wave signal emitted from another query wave transmitting device is received, the RFID reader stops the query wave emitting means for a predetermined period of time.

Alternatively, in the first aspect, it is desirable that the RFID reader activates the reply wave receiving means when a predetermined input operation is executed via a user interface.

In both configurations of the first aspect, the RFID reader desirably further includes a query wave emitting means for emitting the query wave signal such that the query wave transmitting means is activated after the reply wave receiving means is activated.

In the first aspect, it is favorable that the RFID reader further includes a communicating means for communicating with another device, and the RFID reader activates the reply wave receiving means in response to an instruction from another device.

To achieve the above object, in accordance with a second aspect of the present invention, there is provided an RFID reading system including a first and a second RFID readers. The first RFID reader comprises a query wave emitting means for emitting a query wave signal and thereby requesting an RFID tag to transmit its unique information and a reply wave receiving means for receiving a reply wave signal including the unique information transmitted from the RFID tag in response to the query wave signal. The second RFID reader comprises, in addition to the query wave emitting means and the reply wave receiving means, an RFID tag storing unique information. The RFID tag of the second RFID reader stores its identification as the unique information, the identification indicating that the reader is the second RFID reader. The first RFID reader stops, when the identification is received from the second RFID as the reply wave signal, the query wave emitting means for a predetermined period of time.

To achieve the above object, in accordance with a third aspect of the present invention, there is provided an RFID reading system including RFID readers and an RFID read control module connected via a network to the RFID readers. A reader includes a query wave transmitting means for emitting a query wave signal and thereby requesting an RFID tag to transmit unique information, a reply wave receiving means for receiving a reply wave signal including the unique information transmitted from the RFID tag in response to the query wave signal, and a query wave receiving means for receiving the query wave signal emitted from another query wave transmitting device. The RFID read control module controls the RFID reader. The RFID read control module includes a storage means for storing query wave transmission timing information indicating timing for each query wave transmitting means to transmit the query wave. The RFID read control module transmits, in response to an RFID reader, the query wave transmission timing information to an RFID reader. The RFID reader activates, according to the query wave transmission timing information received from the RFID read control module, the query wave receiving means up to the timing at which the query wave transmitting transmits the query wave signal and activates the reply wave receiving means after the timing.

Also, to achieve the object in accordance with a fourth aspect of the present invention, there is provided an RFID reading system including RFID readers and an RFID read control module and at least one query wave transmitting unit for emitting a query wave signal and thereby requesting an RFID tag to transmit unique information. An RFID reader comprises a reply wave receiving means for receiving a reply wave signal including the unique information transmitted from the RFID tag in response to the query wave signal and a query wave receiving means for receiving the query wave signal emitted from another query wave transmitting device. The RFID read control module is connected via a network to the query wave transmitting unit and the RFID readers, and controls the query wave transmitting unit and the RFID readers. The RFID read control module includes a storage means for storing query wave transmission timing information indicating timing for each query wave transmitting unit to transmit the query wave. The RFID read control module transmits, in response to a query from an RFID reader, the query wave transmission timing information to the RFID reader. The RFID reader is activated, according to the query wave transmission timing information received from the RFID read control module, the query wave receiving means up to the timing at which the query wave transmitting unit transmits the query wave signal and activates the reply wave receiving means after the timing.

To achieve the above object, there is provided in accordance with a fifth aspect of the present invention an RFID reading system including RFID readers, an RFID read control module and at least one query wave transmitting unit for emitting a query wave signal and thereby requesting an RFID tag to transmit unique information. An RFID reader comprises a reply wave receiving means for receiving a reply wave signal including the unique information transmitted from the RFID tag in response to the query wave signal and a query wave receiving means for receiving the query wave signal emitted from another device. The RFID read control module is connected via a network to the query wave transmitting unit and the RFID readers and controls the query wave transmitting unit and the RFID readers. The RFID read control module includes a storage means for storing query wave transmission timing information indicating timing for the query wave transmitting unit to transmit the query wave. The RFID read control module transmits, in response to a query from the RFID reader, the query wave transmission timing information to an RFID reader. The RFID reader activates, according to the query wave transmission timing information received from the RFID read control module, the reply wave receiving means after the timing at which the query wave transmitting unit transmits the query wave signal.

To achieve the above object, in accordance with a sixth aspect of the present invention, there is provided an RFID reading method including the steps of emitting a query wave signal requesting transmission of unique information from a query wave transmitting unit to an RFID tag, and receiving by an RFID reader a reply signal including the unique information transmitted from the RFID tag in response to the query wave signal.

In the sixth aspect, it is desirable that the RFID reader receives the query wave signal emitted from another device, and when the query wave signal emitted from another device is received, the transmission of the query wave signal is stopped for a predetermined period of time.

In addition, it is favorable that when the query wave signal emitted from another device is received, the RFID reader makes a transition to a reception wait state to wait for reception of the reply wave signal. Additionally, the RFID reader more desirably transmits the query wave signal when a predetermined period lapses after reception of the query wave signal emitted from another device.

In either one of the configurations of the sixth aspect, it is favorable that the RFID reader emits the query wave signal after having made a transition to the reception wait state to wait for reception of the reply wave signal.

In the sixth aspect or in a configuration in which when a query wave signal emitted from another device is received, the transmission of the query wave signal from the RFID reader is stopped for a predetermined period of time, it is desirable that the RFID reader makes a transition to a reception wait state to wait for reception of the reply wave signal when a predetermined input operation is executed via a user interface. Alternatively, the RFID reader favorably makes a transition to a reception wait state to wait for reception of the reply wave signal in response to an instruction from another device.

To achieve the above object in accordance with a seventh aspect of the present invention, there is provided an RFID reading method for use with an RFID reading system including a first RFID reader including a query wave emitting means for emitting a query wave signal and thereby requesting an RFID tag to transmit unique information and a reply wave receiving means for receiving a reply wave signal including the unique information transmitted from the RFID tag in response to the query wave signal, and a second RFID reader including the query wave emitting means, the reply wave receiving means, and an RFID tag storing, as unique information, an identification indicating that the reader is the second RFID reader. The method includes the step in which the first RFID reader stops, when the identification is received from the second RFID as the reply wave signal, the query wave emitting unit for a predetermined period of time.

To achieve the above object, there is provided in accordance with an eighth aspect of the present invention an RFID reading method for use with an RFID reading system including an RFID reader and an RFID read control module connected via a network to the RFID reader, the reader including a query wave transmitting means for emitting a query wave signal and thereby requesting an RFID tag to transmit unique information, a reply wave receiving means for receiving a reply wave signal including the unique information transmitted from the RFID tag in response to the query wave signal, and a query wave receiving means for receiving the query wave signal emitted from another device, the RFID read control module controlling the RFID reader. The RFID reader requests the RFID read control module to transmit query wave transmission timing information indicating timing at which the query wave transmitting unit transmits the query wave signal. The RFID read control module reads, in response to the request from the RFID reader, the query wave transmission timing information from storage means. The RFID read control module transmits the query wave transmission timing information read from the storage means to an RFID reader. The RFID reader activates, according to the query wave transmission timing information received from the RFID read control module, the query wave receiving means up to the timing at which the query wave transmitting unit transmits the query wave signal and activates the reply wave receiving means after the timing.

To achieve the above object in accordance with a ninth aspect of the present invention, there is provided an RFID reading method for use with an RFID reading system including RFID readers, an RFID read control module and at least one query wave transmitting unit for emitting a query wave signal and thereby requesting an RFID tag to transmit unique information, where an RFID reader comprises a reply wave receiving means for receiving a reply wave signal including the unique information transmitted from the RFID tag in response to the query wave signal and a query wave receiving means for receiving the query wave signal emitted from another device, and the RFID read control module, being connected via a network to the query wave transmitting unit and the RFID readers, controls the query wave transmitting unit and the RFID readers. The RFID reader requests the RFID read control module to transmit query wave transmission timing information indicating timing at which the query wave transmitting unit transmits the query wave signal. The RFID read control module reads, in response to the request from the RFID reader, the query wave transmission timing information from storage means. The RFID read control module transmits the query wave transmission timing information read from the storage means to an RFID reader. The RFID reader activates, according to the query wave transmission timing information received from the RFID read control module, the query wave receiving means up to the timing at which the query wave transmitting unit transmits the query wave signal and activates the reply wave receiving means after the timing.

To achieve the above object in accordance with a tenth aspect of the present invention, there is provided an RFID reading method for use with an RFID reading system including RFID readers, an RFID read control module and at least one query wave transmitting unit for emitting a query wave signal and thereby requesting an RFID tag to transmit unique information, where an RFID reader comprises a reply wave receiving means for receiving a reply wave signal including the unique information transmitted from the RFID tag in response to the query wave signal and a query wave receiving means for receiving the query wave signal emitted from another device, and the RFID read control module, being connected via a network to the query wave transmitting unit and the RFID readers, controls the query wave transmitting unit and the RFID readers. The RFID reader requests the RFID read control module to transmit query wave transmission timing information indicating timing at which the query wave transmitting unit transmits the query wave signal. The RFID read control module reads, in response to the request from the RFID reader, the query wave transmission timing information from a storage means. The RFID read control module transmits the query wave transmission timing information read from the storage means to an RFID reader. The RFID reader makes, according to the query wave transmission timing information received from the RFID read control module, a transition to the reception wait state of to wait for reception of the reply wave signal after the timing.

To achieve the above object, there is provided in accordance with an eleventh aspect of the present invention an RFID reader including a reply wave receiving means for receiving a reply wave signal including unique information transmitted from an RFID tag in response to a query wave signal emitted from a query wave transmitting unit.

In the eleventh aspect, it is favorable that the RFID reader further includes a transmission wave emitting means for transmitting the query wave signal and a means for receiving the query wave signal emitted from another query wave transmitting device. When the query wave signal emitted from another device is received, the transmission wave emitting means is stopped for a predetermined period of time. Alternatively, it is favorable that the RFID reader further includes a means for receiving the query wave signal emitted from another query wave transmitting device such that when the query wave signal is received, the reply wave receiving means is stopped for a predetermined period of time. In addition, it is desirable that the RFID reader further includes a query wave emitting means for transmitting the query wave signal. When the query wave signal emitted from another device is received, the query wave emitting means is stopped for a predetermined period of time.

In both of the above configurations, it is favorable that the RFID reader further includes a query wave emitting means for transmitting the query wave signal. The query wave transmitting means is activated after the reply wave receiving means is activated.

In accordance with the eleventh aspect, it is desirable that the RFID reader activates the reply wave receiving means when a predetermined input operation is executed via a user interface.

In the eleventh aspect, it is favorable that the RFID reader further includes a communicating unit for communicating with another device such that the RFID reader activates the reply wave receiving means in response to an instruction from another device.

To achieve the above object in accordance with a twelfth aspect of the present invention, there is provided an RFID reader including a query wave emitting means for emitting a query wave signal and thereby requesting an RFID tag to transmit unique information, and a reply wave receiving means for receiving a reply wave signal including the unique information transmitted from the RFID tag in response to the query wave signal. The RFID reader stops, when an identification indicating that the reader is an RFID reader including an RFID tag storing unique information is received from a second RFID reader as the reply wave signal, the query wave emitting means for a predetermined period of time.

To achieve the above object, there is provided in accordance with a thirteenth aspect of the present invention an RFID reader including a query wave emitting means for emitting a query wave signal and thereby requesting an RFID tag to transmit unique information a reply wave receiving means for receiving a reply wave signal including the unique information transmitted from the RFID tag in response to the query wave signal, and an RFID tag storing unique information. The RFID tag stores its identification as the unique information. The identification indicates that the reader is an RFID reader including an RFID tag.

To achieve the above object in accordance with a fourteenth aspect of the present invention, there is provided an RFID reader including a query wave emitting means for emitting a query wave signal and thereby requesting an RFID tag to transmit unique information, a reply wave receiving means for receiving a reply wave signal including unique information transmitted from an RFID tag in response to the query wave signal, a query wave receiving means for receiving the query wave signal emitted from another query wave transmitting device, and a means for requesting an RFID read control module including a storage means query wave transmission timing information indicating timing for the query wave transmitting unit to transmit the query wave signal, to transmit the query wave transmission timing information. The RFID reader activates, according to the query wave transmission timing information received from the RFID read control module, the query wave receiving means up to the timing at which the query wave transmitting means transmits the query wave signal and after the timing activates the reply wave receiving means.

To achieve the above object in accordance with a fifteenth aspect of the present invention, there is provided RFID readers including a reply wave receiving means for receiving a reply wave signal including unique information transmitted from an RFID tag in response to a query wave signal, a query wave receiving means for receiving the query wave signal emitted from another query wave transmitting device, and a means for requesting an RFID read control module including a storage means storing query wave transmission timing information indicating timing for a query wave transmitting unit for producing the query wave signal to transmit the query wave signal, to transmit the query wave transmission timing information. The RFID reader makes, according to the query wave transmission timing information obtained from the RFID read control module, a transition to a reception wait state to wait for reception of the reply wave signal after the timing at which the query wave transmitting unit transmits the query wave signal.

To achieve the above object in accordance with a sixteenth aspect of the present invention, there is provided an RFID read control module connected via a network to an RFID reader comprising a query wave transmitting means for emitting a query wave signal and thereby requesting an RFID tag to transmit unique information unique thereto, a reply wave receiving means for receiving a reply wave signal including the unique information transmitted from the RFID tag in response to the query wave signal, and a query wave receiving means for receiving the query wave signal emitted from another query wave transmitting device. The RFID read control module includes a storage means for storing query wave transmission timing information indicating timing for each query wave transmitting unit to transmit the query wave. The RFID read control module transmits, in response to a query from the RFID reader, the query wave transmission timing information to an RFID reader.

To achieve the above object in accordance with a seventeenth aspect of the present invention, there is provided an RFID read control module connected via a network to RFID readers and at least one query wave transmitting unit for emitting a query wave signal and thereby requesting an RFID tag to transmit unique information unique thereto, where an RFID reader comprises a reply wave receiving means for receiving a reply wave signal including the unique information transmitted from the RFID tag in response to the query wave signal and a query wave receiving means for receiving the query wave signal emitted from another device, and the RFID read control module controls the query wave transmitting unit and the RFID readers. The RFID read control module includes a storage means for storing query wave transmission timing information indicating timing for each query wave transmitting unit to transmit the query wave. The RFID read control module transmits, in response to a query from the RFID reader, the query wave transmission timing information to an RFID reader.

To achieve the above object in accordance with a eighteenth aspect of the present invention, there is provided an RFID read control module connected via a network to RFID readers and at least one query wave transmitting unit for emitting a query wave signal and thereby requesting an RFID tag to transmit unique information unique thereto, where an RFID reader comprises a reply wave receiving means for receiving a reply wave signal including the unique information transmitted from the RFID tag in response to the query wave signal and a query wave receiving means for receiving the query wave signal emitted from another query wave transmitting device, and the RFID read control module controls the query wave transmitting unit and the RFID readers. The RFID read control module includes a storage means for storing query wave transmission timing information indicating timing for each query wave transmitting unit to transmit the query wave. The RFID read control module transmits, in response to a query from an RFID reader, the query wave transmission timing information to an RFID reader.

To achieve the above object in accordance with a nineteenth aspect of the present invention, there is provided an RFID reader control program for making a substantial computer controlling an RFID reader execute reply wave receiving processing to receive a reply wave signal including unique information transmitted from an RFID tag in response to a query wave signal emitted from a query wave transmitting unit.

In accordance with the nineteenth aspect, it is favorable that the program further makes the computer execute query wave signal emitting processing to transmit the query wave signal and processing to receive the query wave signal emitted from another query wave transmitting device. When the query wave signal is received, execution of the transmission wave emitting processing is preferably stopped for a predetermined period of time. Or, it is desirable that the program further makes the computer execute processing to receive the query wave signal emitted from another query wave transmitting device. When the query wave signal is received, the reply wave receiving processing is preferably executed. Additionally, it is favorable that the program further makes the computer execute query wave emitting processing to transmit the query wave signal. When the query wave signal emitted from another query wave transmitting device is received, execution of the query wave emitting processing is desirably stopped for a predetermined period of time.

In both of the above configurations, it is favorable that the program further makes the computer execute, after execution of the reply wave receiving processing, query wave emitting processing to transmit the query wave signal.

In the nineteenth aspect or a configuration in which the program further makes the substantial computer execute a transmission wave emitting processing to transmit a query wave signal and processing to receive a query wave signal emitted from another query wave transmitting device such that the execution of the transmission wave emitting processing is stopped for a predetermined period of time when a query wave signal is received. It is desirable that the program further makes the computer execute the reply wave receiving processing when a predetermined input operation is executed via a user interface. Alternatively, it is favorable that the program further makes the computer execute the reply wave receiving processing in response to an instruction from another device.

To achieve the above object in accordance with a twentieth aspect of the present invention, there is provided an RFID reader control program for a substantial computer controlling an RFID reader including a query wave emitting means for emitting a query wave signal and thereby requesting an RFID tag to transmit unique information unique thereto and a reply wave receiving means for receiving a reply wave signal including the unique information transmitted from the RFID tag in response to the query wave signal. The program makes the computer execute processing to stop the query wave emitting means for a predetermined period of time when identification is received from another RFID reader as the reply wave signal. The identification indicates that the reader is an RFID reader including an RFID tag storing unique information.

To achieve the above object, there is provided in accordance with a twenty-first aspect of the present invention an RFID reader control program for controlling an RFID reader including a query wave emitting means for emitting a query wave signal and thereby requesting an RFID tag to transmit unique information unique thereto, a reply wave receiving means for receiving a reply wave signal including the unique information transmitted from the RFID tag in response to the query wave signal, and a query wave receiving means for receiving the query wave signal emitted from another device. The program makes a substantial computer controlling the RFID reader execute processing to request an RFID read control module including a storage means storing query wave transmission timing information indicating timing for the query wave transmitting unit to transmit the query wave signal, to transmit the query wave transmission timing information; and processing to activate, according to the query wave transmission timing information received from the RFID read control module, the query wave receiving means up to the timing at which the query wave transmitting unit transmits the query wave signal and to activate the reply wave receiving means after the timing.

To achieve the above object in accordance with a twenty-second aspect of the present invention, there is provided an RFID reader control program for controlling an RFID reader including a reply wave receiving means for receiving a reply wave signal including unique information transmitted from an RFID tag in response to a query wave signal and a query wave receiving means for receiving the query wave signal emitted from another device. The program makes a substantial computer controlling the RFID read control module execute processing to request an RFID read control module including a storage means storing query wave transmission timing information indicating timing for a query wave transmitting unit to produce the query wave signal, to transmit the query wave transmission timing information, and processing to make, according to the query wave transmission timing information obtained from the RFID read control module, a transition to a reception wait state to wait for reception of the reply wave signal after the timing at which the query wave transmitting unit transmits the query wave signal.

To achieve the above object, there is provided in accordance with a twenty-third aspect of the present invention a computer-readable information recording medium storing the RFID reader control program.

To achieve the above object in accordance with a twenty-fourth aspect of the present invention, there is provide an RFID read control module control program for controlling an RFID read control module connected via a network to an RFID reader comprising a query wave transmitting means for emitting a query wave signal and thereby requesting an RFID tag to transmit unique information unique thereto, a reply wave receiving means for receiving a reply wave signal including the unique information transmitted from the RFID tag in response to the query wave signal and a query wave receiving means for receiving the query wave signal emitted from another device. The program makes a substantial computer controlling the RFID reader control module execute processing to read from a storage means, in response to a query from the RFID reader, query wave transmission timing information indicating timing at which the query wave transmitting unit transmits the query wave signal; and processing to transmit the query wave transmission timing information to an RFID reader.

To achieve the above object, there is provided in accordance with a twenty-fifth aspect of the present invention an RFID read control module control program for controlling an RFID read control module connected via a network to RFID readers and at least one query wave transmitting unit for emitting a query wave signal and thereby requesting an RFID tag to transmit unique information unique thereto, where an RFID reader comprises a reply wave receiving means for receiving a reply wave signal including the unique information transmitted from the RFID tag in response to the query wave signal and a query wave receiving means for receiving the query wave signal emitted from another device, and the RFID read control module controls the query wave transmitting unit and the RFID readers. The program makes a substantial computer controlling the RFID read control module execute processing to read from a storage means, query wave transmission timing information indicating timing for the query wave transmitting unit to transmit the query wave; and processing to transmit the query wave transmission timing information to an RFID reader.

To achieve the above object in accordance with a twenty-sixth aspect of the present invention, there is provide an RFID read control module control program for controlling an RFID read control module connected via a network to RFID readers and at least one query wave transmitting unit for emitting a query wave signal and thereby requesting an RFID tag to transmit unique information unique thereto, where an RFID reader comprises a reply wave receiving means for receiving a reply wave signal including the unique information transmitted from the RFID tag in response to the query wave signal and a query wave receiving means for receiving the query wave signal emitted from another device, and the RFID read control module controls the query wave transmitting unit and the RFID readers. The program makes a substantial computer controlling the RFID read control module execute processing to read from a storage means, query wave transmission timing information indicating timing for the query wave transmitting unit to transmit the query wave, in response to a query from the RFID reader; and processing to transmit the query wave transmission timing information to an RFID reader.

To achieve the above object, there is provided in accordance with a twenty-seventh aspect of the present invention a computer-readable information recording medium storing the RFID reader control module control program.

In accordance with the present invention, there can be provided an RFID reading system, an RFID reading method, an RFID reader, an RFID read control apparatus, an RFID reader control program, a computer-readable information recording medium storing the RFID reader control program, an RFID read control apparatus control program, and a computer-readable information recording medium storing the RFID read control apparatus control program in which even if mobile readers are employed, the interference can be prevented between the readers.

BRIEF DESCRIPTION OF THE DRAWINGS

The objects and features of the present invention will become more apparent from the consideration of the following detailed description taken in conjunction with the accompanying drawings in which:

FIG. 17 is a block diagram showing an example of a hardware configuration used in a seventh embodiment;

FIG. 19 is a diagram schematically showing an example of a system configuration applied to an eighth embodiment;

FIG. 20 is a block diagram showing an example of a hardware configuration employed in the eighth embodiment;

FIG. 21 is a flowchart showing an example of an operation procedure of a reader adopted in the eighth embodiment;

FIG. 22 is a flowchart showing an example of an operation procedure of a reader control server employed in the eighth embodiment;

FIG. 31 is a flowchart showing an example of a flow of a reader read time calculation program;

FIG. 32 is a table showing an example of a read time list;

FIG. 33 is a table showing an example of a read time list;

FIG. 34 is a table showing an example of a read time list;

FIG. 36 is a flowchart showing a flow of a reader read time list generation program;

FIG. 40 is a flowchart showing a flow of an algorithm to calculate a time-out time applied to a tenth embodiment;

FIG. 41 is a table showing an example of a read time list used as a reader read control table;

FIG. 45 is a table showing a layout of a reader read control table with available channel;

FIG. 52 is a flowchart showing a first operation example of a reader control server used in a thirteenth embodiment;

FIG. 53 is a flowchart showing a second operation data example of a reader control server used in a thirteenth embodiment;

FIG. 54 is a flowchart showing a third operation data example of a reader control server used in a thirteenth embodiment; and FIG. 55 is a diagram showing a flow of operation of the thirteenth embodiment.

DESCRIPTION OF THE EMBODIMENTS

Configuration of First Embodiment

Figure 1:
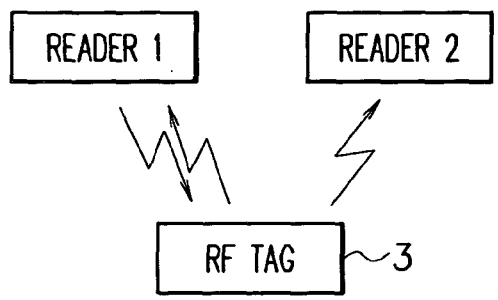
FIG. 1 is an example of a basic configuration diagram of a tag information acquisition system including a plurality of readers, the example showing a conceptual block diagram to explain a relationship between two readers and an RF tag.

As can be seen from FIG. 1, the first embodiment of the tag information acquisition system including a plurality of readers includes a system including a reader 1 and a reader 2.

Figure 2:
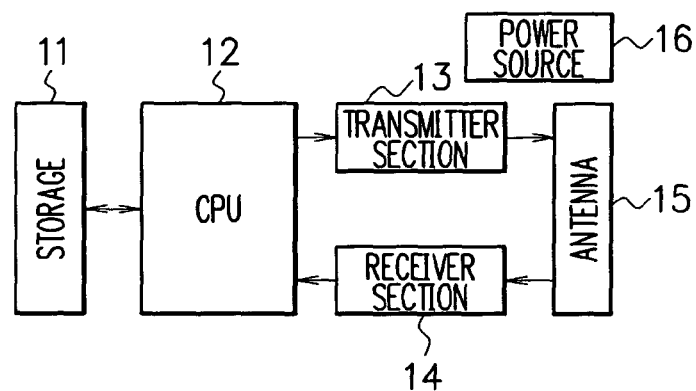
FIG. 2 is a block diagram showing an example of a configuration of a reader 1.

FIG. 2 shows an example of a configuration of the reader 1 including a central processing unit (CPU) section 12. The CPU section 12 includes a CPU and a temporary storage section to temporarily store data for operation of the CPU. The CPU section 12 reads from a storage area 11 information about timing to emit a query wave and transmission data and sends the data to a transmitter section 13. The transmitter section 13 modulates the transmission data and delivers the modulated data to an antenna 15. The antenna 15 receives reply data from an RF tag. The reply data is fed to a receiver section 14. The receiver section 14 demodulates and decodes the data. Received data thus decoded is transferred to the CPU section 12. The CPU section 12 loads, using data reception as a trigger, an appropriate program from the storage area 11 to execute the program. The system also includes a power source 16 which is a battery to supply power to the respective constituent components.

Figure 3:
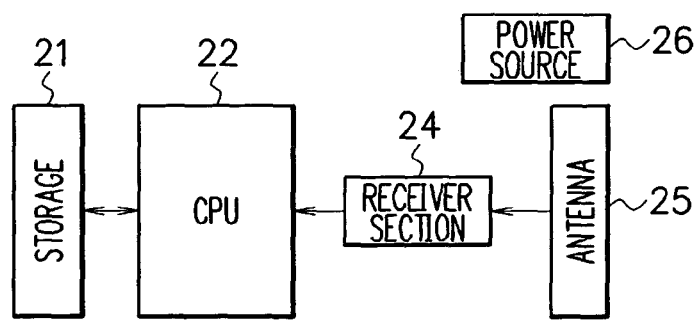
FIG. 3 is a block diagram showing an example of a configuration of a reader 2.

FIG. 3 shows a configuration of the reader 2. The reader 2 includes a storage area 21, a CPU section 22, a receiver section 24, an antenna 25, and a power source 26. The configuration of the reader 2 is implemented by removing a functional section corresponding to the transmitter section 13 from the configuration of the reader 1. For the capability to communicate with an external device, the reader 2 has only a function to receive a reply wave.

The embodiment of the system includes two readers, i.e., the reader 1 which emits a query wave to receive a reply wave in response to the query wave and the reader 2 to receive only a reply wave. However, the system may include a plurality of readers 1 and a plurality of readers 2. The readers to read the RF tag identification include a Personal Digital Assistant (PDA) including an RFID reader, a computer including an RFID reader, and a terminal such as a cellular phone including an RFID reader. A program for reading Ids in RF tags includes a program to control the PDA, the computer, and the terminal.

Operation of First Embodiment

Figure 4:
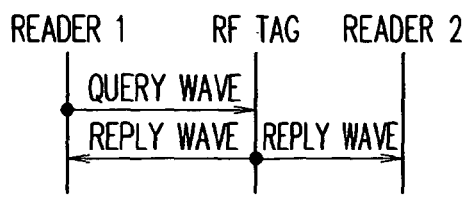
FIG. 4 is a diagram to explain an example of operation in a first embodiment.

FIG. 4 shows a flow of operation of the embodiment of a tag information acquisition system. When the RF tag 3 emits a reply wave in response to the query wave sent from the reader 1, the reader 2 receives the reply wave. The readers 1 and 2 obtain tag information as a result. In this connection, information such as tag identification attained from the reply wave sent from the RF tag is referred to as tag information.

Advantages of First Embodiment

In accordance with the first embodiment of a tag information acquisition system including a plurality of readers, there can be obtained advantages including a first advantage that a plurality of readers can attain tag information without causing interference with each other and a second advantage that the reader 2 can save power consumed to emit a query wave.

Functional Configuration of Second Embodiment

The second embodiment realizes a function that when the reader 2 receives the query wave from the reader 1, the reader 2 enters a reply wave wait state to wait for a reply from an RF tag for a predetermined period of time.

Figure 5:
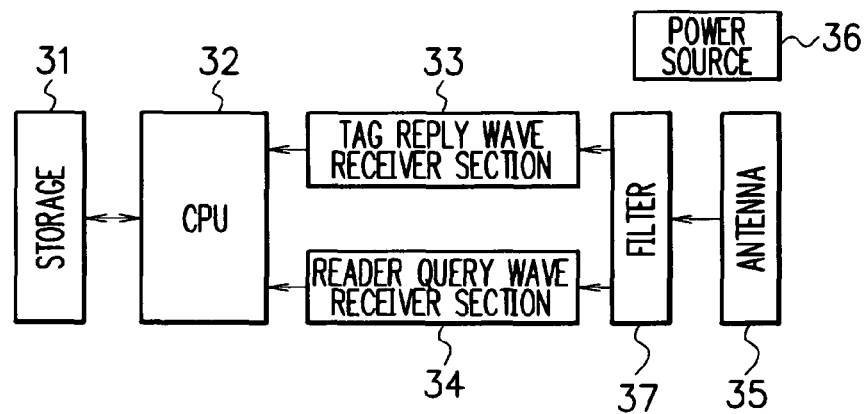
FIG. 5 is a block diagram showing an example of configuration of the reader 2 used in a second embodiment.

The second embodiment may also be configured like the first embodiment, i.e., includes a reader 1 and a reader 2. The reader 1 has a hardware configuration substantially equal to that of the first embodiment. FIG. 5 shows a hardware construction of the reader 2 in the second embodiment. The reader 2 includes, in addition to the configuration of the first embodiment shown in FIG. 3, a reader query wave receiver section 34 and a filter 37. The reader 2 also includes a tag reply wave receiver section 33 corresponding to the receiver section 24 of FIG. 3. The filter 37 filters an electric signal (received signal) of a radio wave received by an antenna 35 to separate the wave into a reply wave from the tag 3 and a query wave from the reader 1. If the reply wave from the tag 3 has a frequency different from that of the query wave from the reader 1, these waves can be separated by a filter according to their frequencies. If the received signal is the reply wave from the tag 3, the signal is fed to the tag reply wave receiver section 33. If the received signal is the query wave from the reader 1, the signal is delivered to the reader query wave receiver section 34. The receiver section 34 then demodulates and decodes the query wave to send a resultant signal to the CPU section 32.

Operation of Second Embodiment

Figure 6:
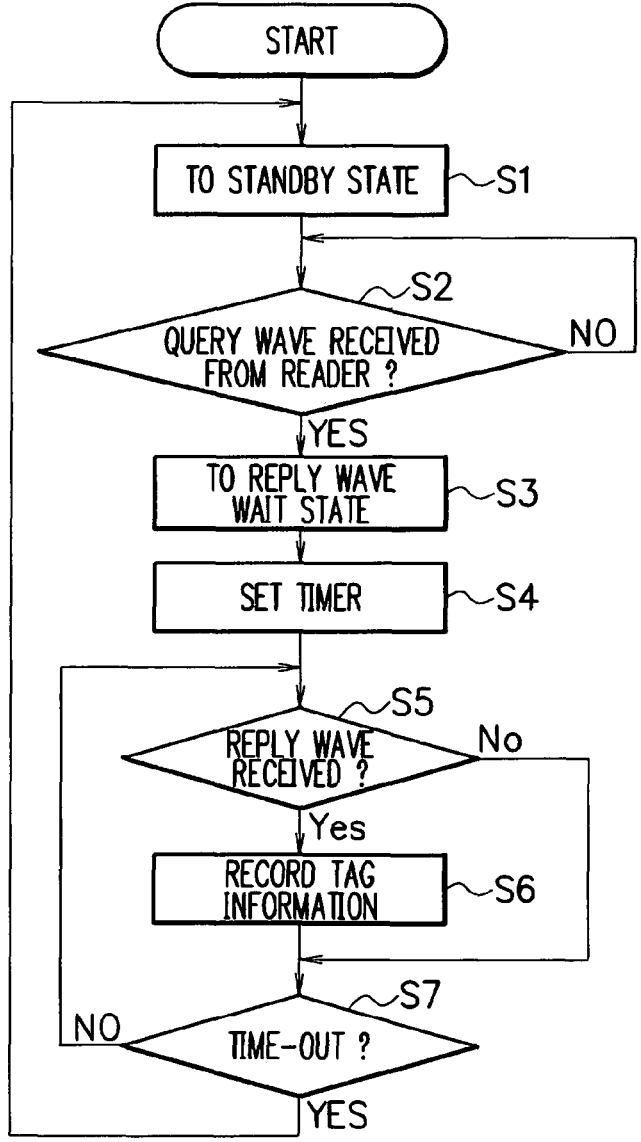
FIG. 6 is a flowchart showing an example of an operation procedure of the second embodiment.

Excepting the reader 2, the constituent components of the second embodiment operate in substantially the same way as the first embodiment. FIG. 6 shows an example of an operation procedure of the reader 2. The reader 2 is initially set to a standby state (step S1). The reader 2 is in a standby state or a reply wave wait state. In the standby state, the reader 2 does not receive a reply wave from the RF tag 3. In the reply wave wait state, the reader 2 receives a reply wave from the RF tag 3. When a query wave is received from the reader 1 (yes in step S2), the reader 2 changes from the standby state to a reply wave wait state. At the same time, a point of time obtained by adding a reply wave wait time to a present time is set as a time-out time to a timer (step S4). The reply wave wait time is a predetermined period of time to wait for a reply wave and is kept in the storage area 31. When tag information is received after this point of time (yes in step S5), the reader 2 records a received identifier (step S6). The reader 2 continuously monitors a reply wave until a time-out event occurs (no in step S7). At occurrence of a time-out event (yes in step S7), the reader 2 returns again to the standby state.

Figure 7:
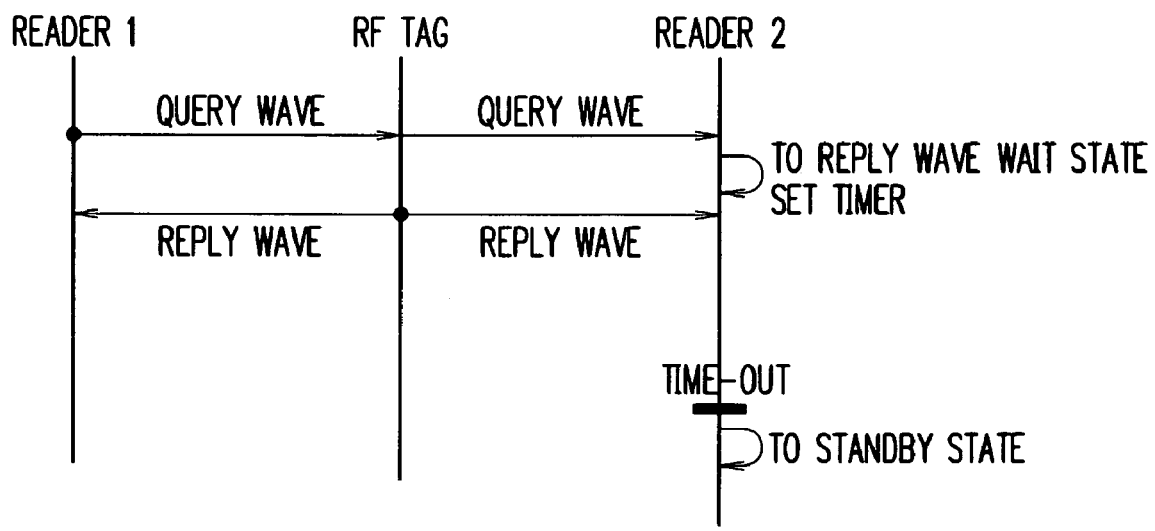
FIG. 7 is a diagram showing an example of an operation procedure for the readers 1 and 2 to acquire tag information in the second embodiment.

FIG. 7 shows an example of a procedure for the readers 1 and 2 to attain tag information. The reader 1 emits a query wave. Having received the query wave, the reader 2 enters a reply wave wait state and sets a timer. Thereafter, the readers 1 and 2 receive a reply wave from the RF tag 3 in response to the query wave emitted from the reader 1. When a time-out event takes place, the reader 2 returns to a standby state.

Advantage of Second Embodiment

When compared with the first embodiment, the second embodiment can reduce the power consumed by the unnecessary wait operation to wait for a reply wave.

Third Embodiment

A third embodiment is now described. A reader enters a reply wave wait state according to an indication from an input section and stays in the wait state to wait for a reply wave from an RF tag for a predetermined period of time.

Figure 8:
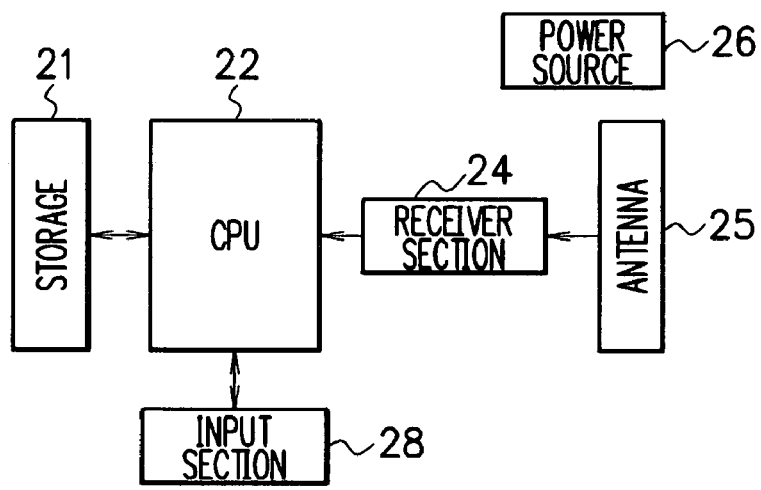
FIG. 8 is a block diagram showing an example of a configuration of the reader 2 adopted in a third embodiment.

The third embodiment of a tag information acquisition system has a configuration almost equal to that of the first embodiment. That is, the embodiment includes a reader 1 and a reader 2. The reader 1 has a hardware configuration similar to that of the first embodiment. FIG. 8 shows an example of the hardware configuration of the reader 2 in the third embodiment. The reader 2 includes an input section 28 in addition to the constituent components of the first embodiment shown in FIG. 3. The input section 28 is arranged to receive a trigger to enter a reply wait state. Specifically, in a case in which an operator directly inputs an indication, a tag read button is disposed as the input section 28. On the other hand, when the input indication is to be supplied from an external device, an appropriate external interface is installed as the input section 28. The input section 28 accordingly produces an output signal to be fed to a CPU section 22.

Figure 9:
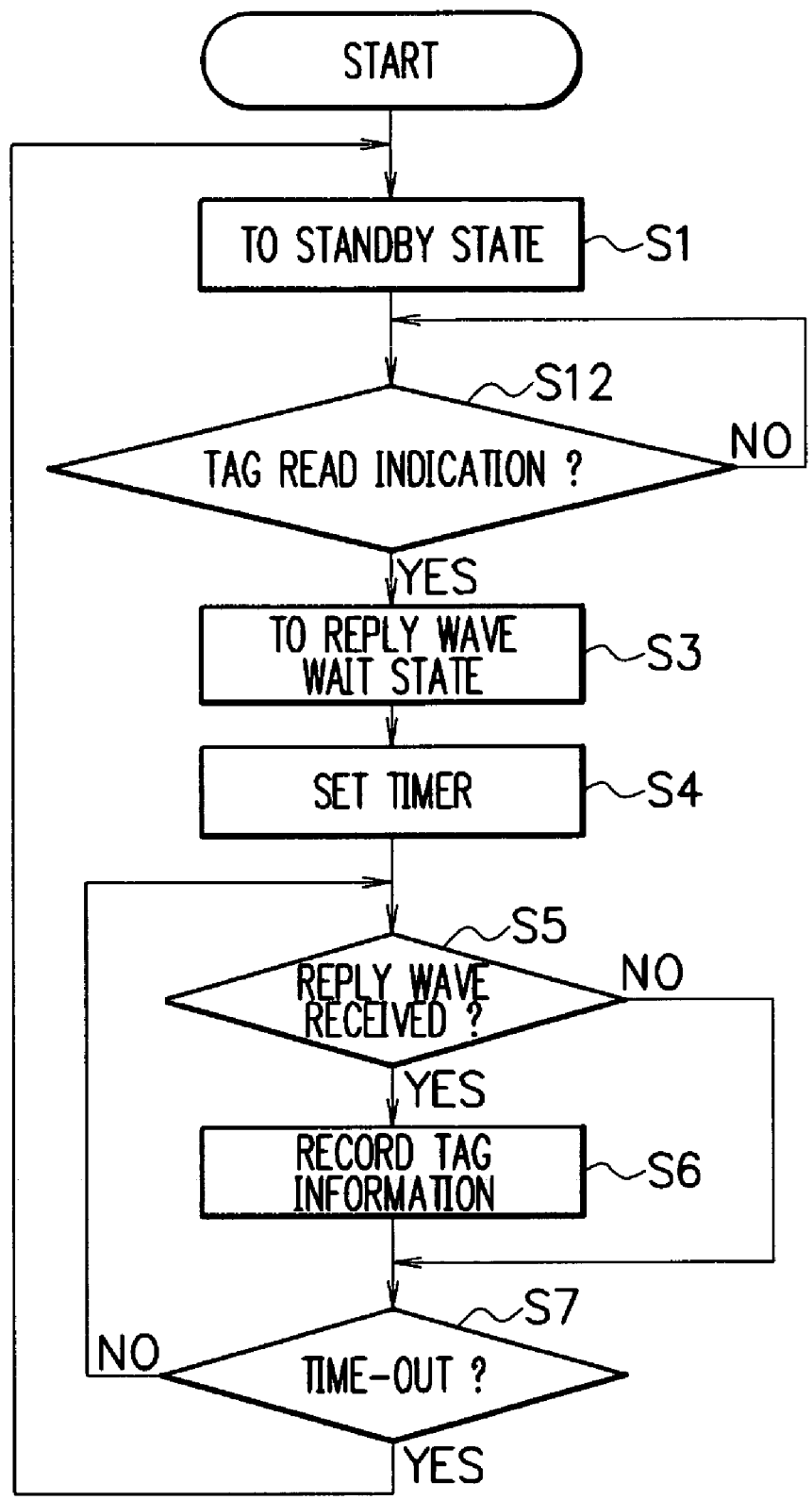
FIG. 9 is a flowchart showing an example of an operation procedure of the reader 2 in a third embodiment.

In the third embodiment, the overall operation is similar to that of the first embodiment excepting the operation of the reader 2. FIG. 9 shows an example of operation of the reader 2. Excepting that the trigger to enter the reply wave wait state (step S12) is a tag read instruction from the input section, the operation flow is substantially equal to that of the second embodiment shown in FIG. 6. In comparison with FIG. 6 in which a check is made in step S2 to determine whether or not a query wave has been received from a reader, a check is made in step S12 of FIG. 9 to determine presence or absence of a tag read indication. The other steps are processed as FIG. 6.

Figure 10:
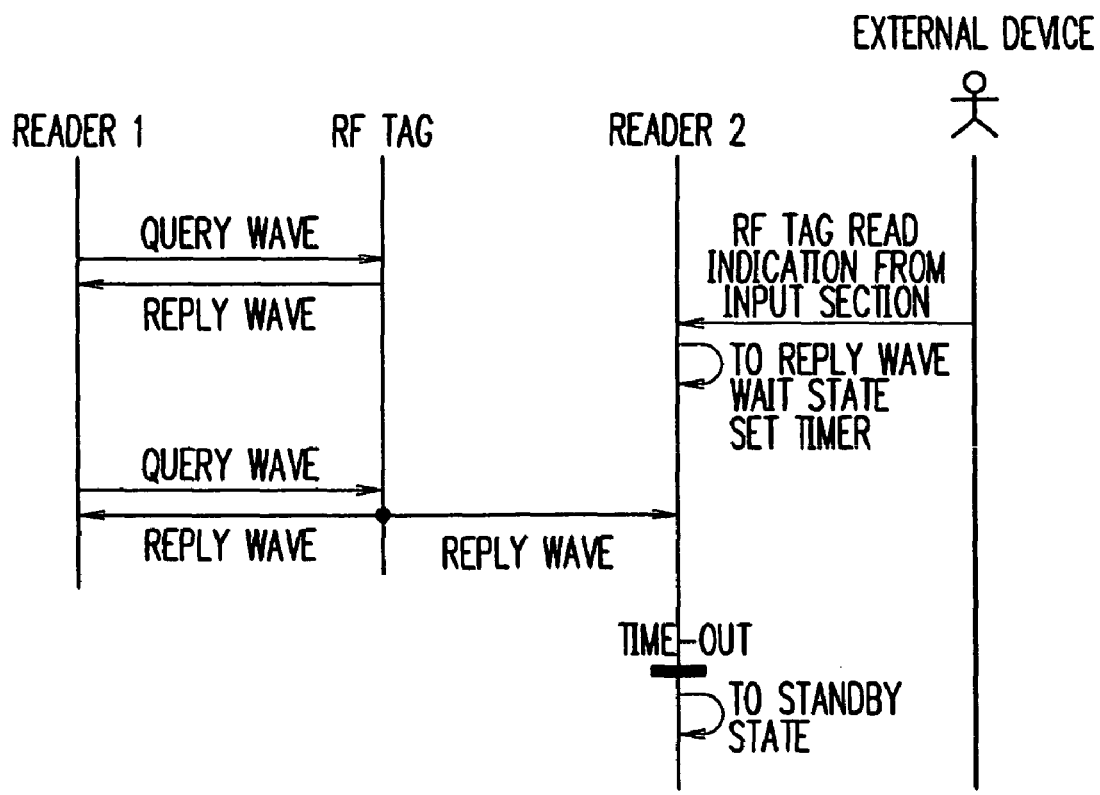
FIG. 10 is a diagram showing an example of a procedure for the reader 2 to obtain tag information using a query wave from the reader 1 in the third embodiment.

FIG. 10 shows an example of a procedure for the reader 2 to acquire tag information through a query wave from the reader 1. In a standby state, the reader 2 does not obtain RF tag identification from any RF tag. After an RF tag read indication is received, the reader 2 enters a reply wave wait state and sets a timer. Thereafter, when the nearby reader 1 emits a query wave, an RF tag emits a reply wave in response to the query wave. The reader 2 receives the reply wave to resultantly obtain tag information. At occurrence of a time-out event, the reader 2 returns to a standby state.

The third embodiment of a tag information acquisition system is advantageous in a case in which a particular tag is read at particular timing. For example, the advantage emerges when the reader 2 is a reader of handy type to be carried about by its user.

Fourth Embodiment

A fourth embodiment is now described. In a tag information acquisition system, a reader 2 emits a query wave after a time-out event takes place.

Figure 11:
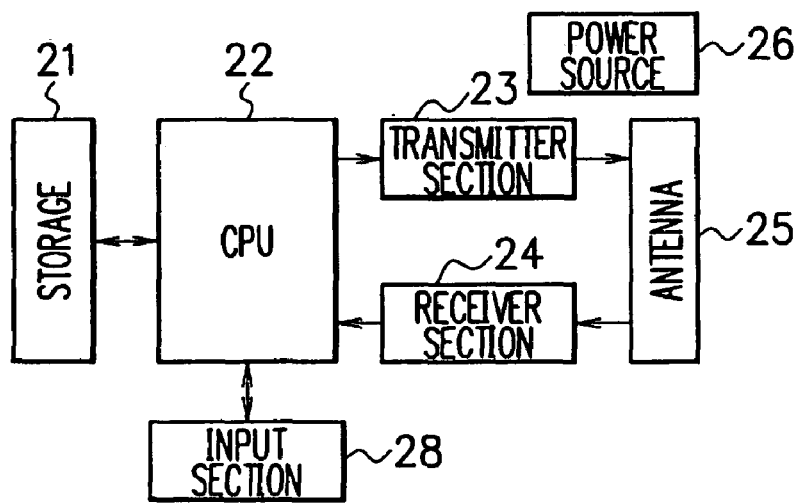
FIG. 11 is a block diagram showing an example of a hardware configuration of the reader 2 adopted in a fourth embodiment.

The fourth embodiment has a basic system configuration substantially equal to that of the first embodiment. That is, the embodiment includes a reader 1 and a reader 2. The reader 1 is similar in the hardware configuration to that of the first embodiment. FIG. 11 shows an example of a hardware configuration of the reader 2 in the fourth embodiment. The reader 2 further includes a transmitter section 23 in addition to the constituent elements of the second embodiment shown in FIG. 2. When the CPU 22 sends transmission data to the transmitter section 23, the transmitter section 23 modulates the data like the transmitter section 13 of FIG. 2 and feeds the modulated data to the antenna 25. Therefore, the fourth embodiment can be applied in almost the same way as for the second embodiment.

Figure 12:
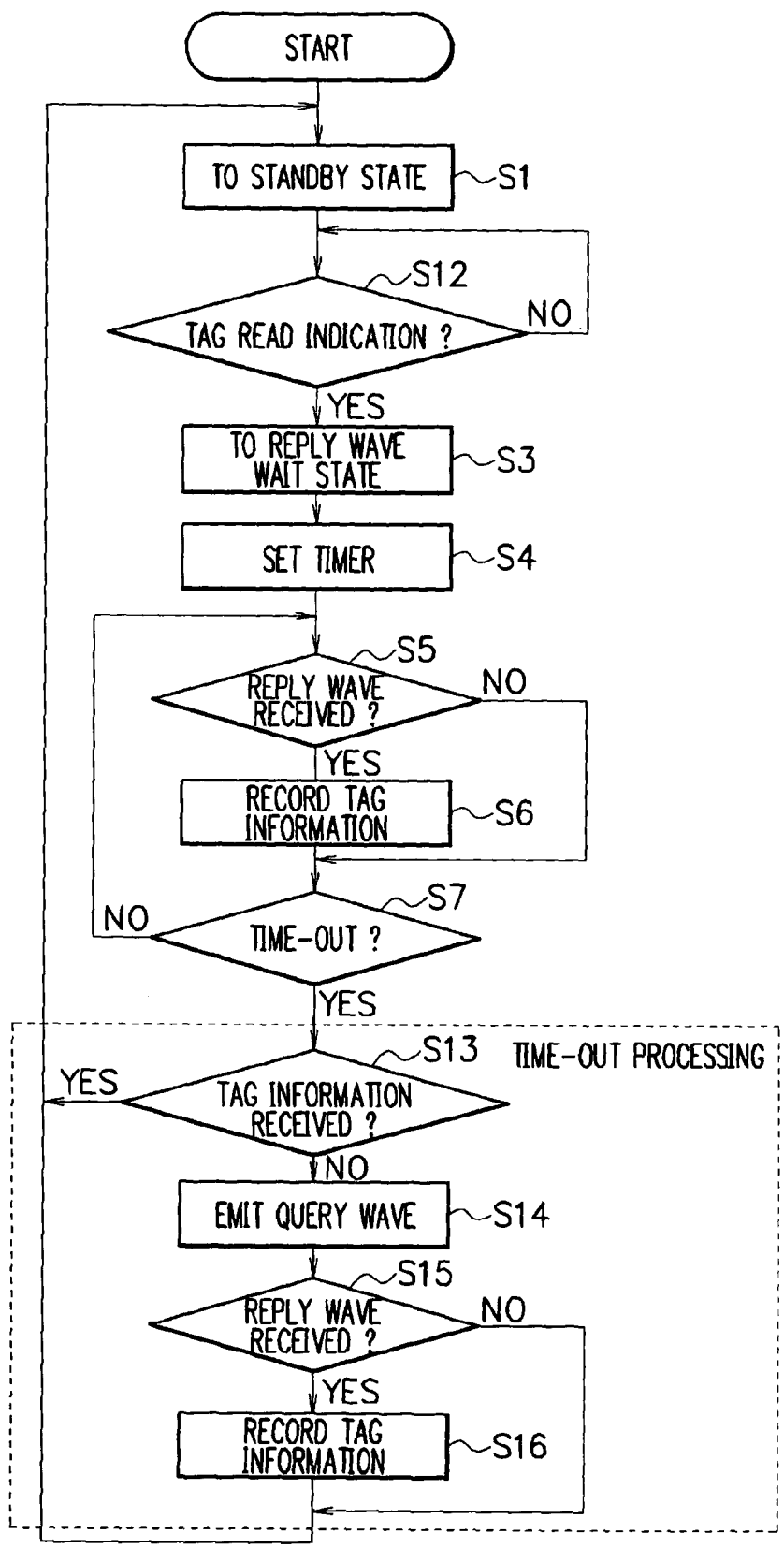
FIG. 12 is a flowchart showing an example of an operation procedure of the reader 2 in the fourth embodiment.

In the fourth embodiment, the operation is almost the same as that of the first embodiment excepting the operation of the reader 2. FIG. 12 shows an example of operation of the reader 2. Processing up to a time-out event (steps S1 o S7) is substantially equal to that of the reader in the third embodiment (FIG. 9). When a time-out event takes place (yes in step S7), the process goes to time-out processing. That is, the reader 2 checks whether tag information has been received during the reply wave wait state (step S13). If tag information has not been received (no in step S13), the reader 2 emits a query wave (step S14) to attempt a wave read operation (step S15). If the reader 2 receives a reply wave in response to the query wave (yes in step S15), the reader 2 records tag information of the reply wave (step S16) and then returns to a standby state.

Although the trigger for the reader 2 to emit a query wave is reception of tag information, the present invention is not restricted by this example. Events acting as a trigger can be arbitrarily set. For example, the reader 2 emits a query wave if the number of tag information items received up to the pertinent point is less than a predetermined value.

Figure 13:
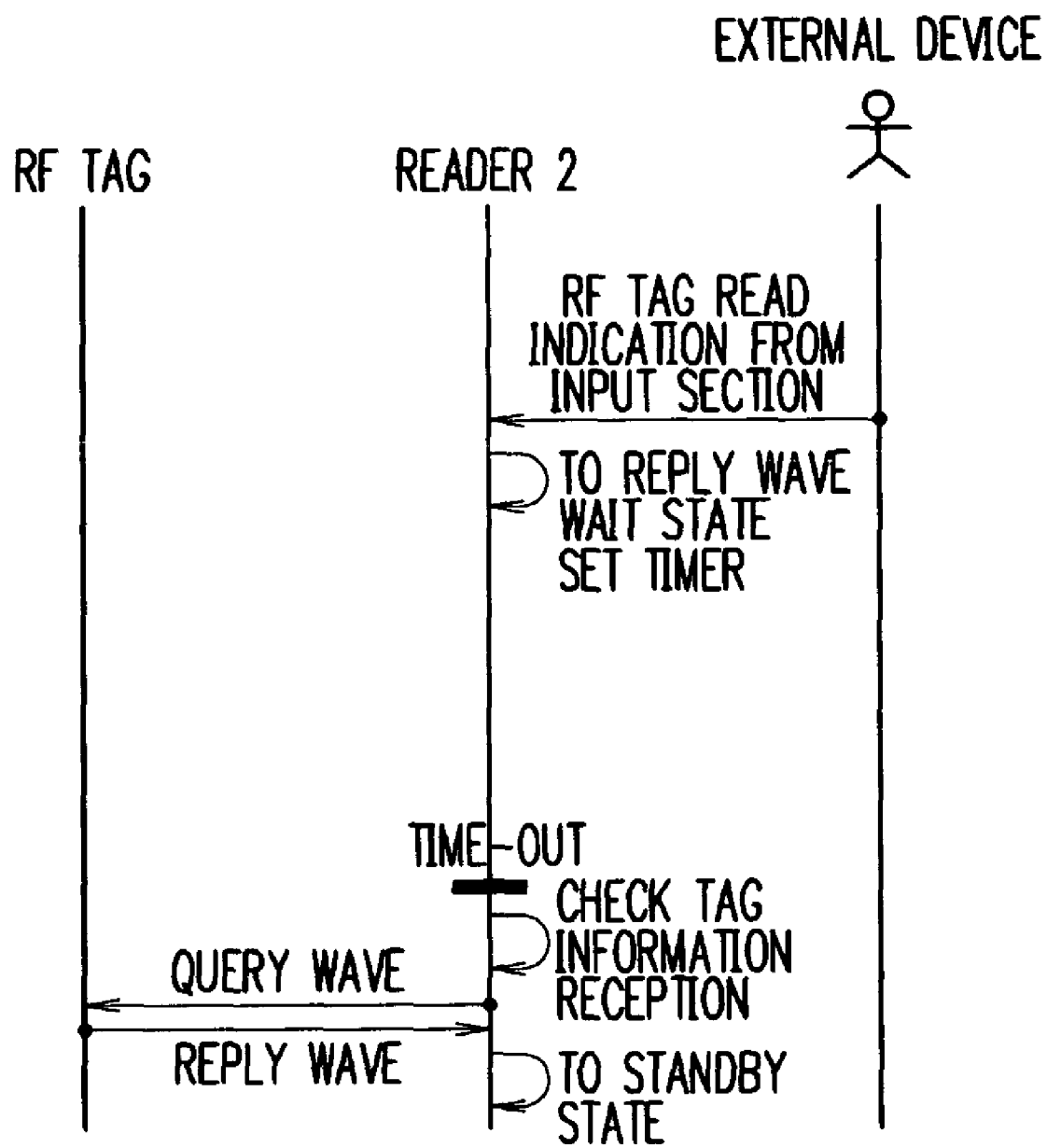
FIG. 13 is a diagram showing an example of an operation procedure for the reader 2 to emit a query wave to acquire tag information in the fourth embodiment.

FIG. 13 shows an example of a sequence of operation in which the reader 2 emits a query wave to acquire tag information. Processing till the timer is set in response to an RF tag read instruction from an external device is similar to that of the third embodiment. Assume that a time-out event occurs thereafter before a reply wave is received. After the time-out, the reader 2 checks whether tag information has been received (step S13 of FIG. 1). Since tag information is not received during the reply wave wait state (no in step S13), the reader 2 emits a query wave (step S14 of FIG. 12). If a tag exists within a reply wave read range, the reader 2 receives a reply wave (yes in step S15 of FIG. 12). The reader 2 then enters a standby state (step S1 of FIG. 12).

The fourth embodiment of the tag information acquisition system leads to an advantage in which the reader emits a query wave after the time-out to ensure acquisition of tag information of a nearby tag.

Fifth Embodiment

A case in which a large number of readers are randomly distributed is described. The fifth embodiment of the tag information acquisition system includes a plurality of readers. The readers are constructed in the same way as the reader 2 of the fourth embodiment.

Figure 14:
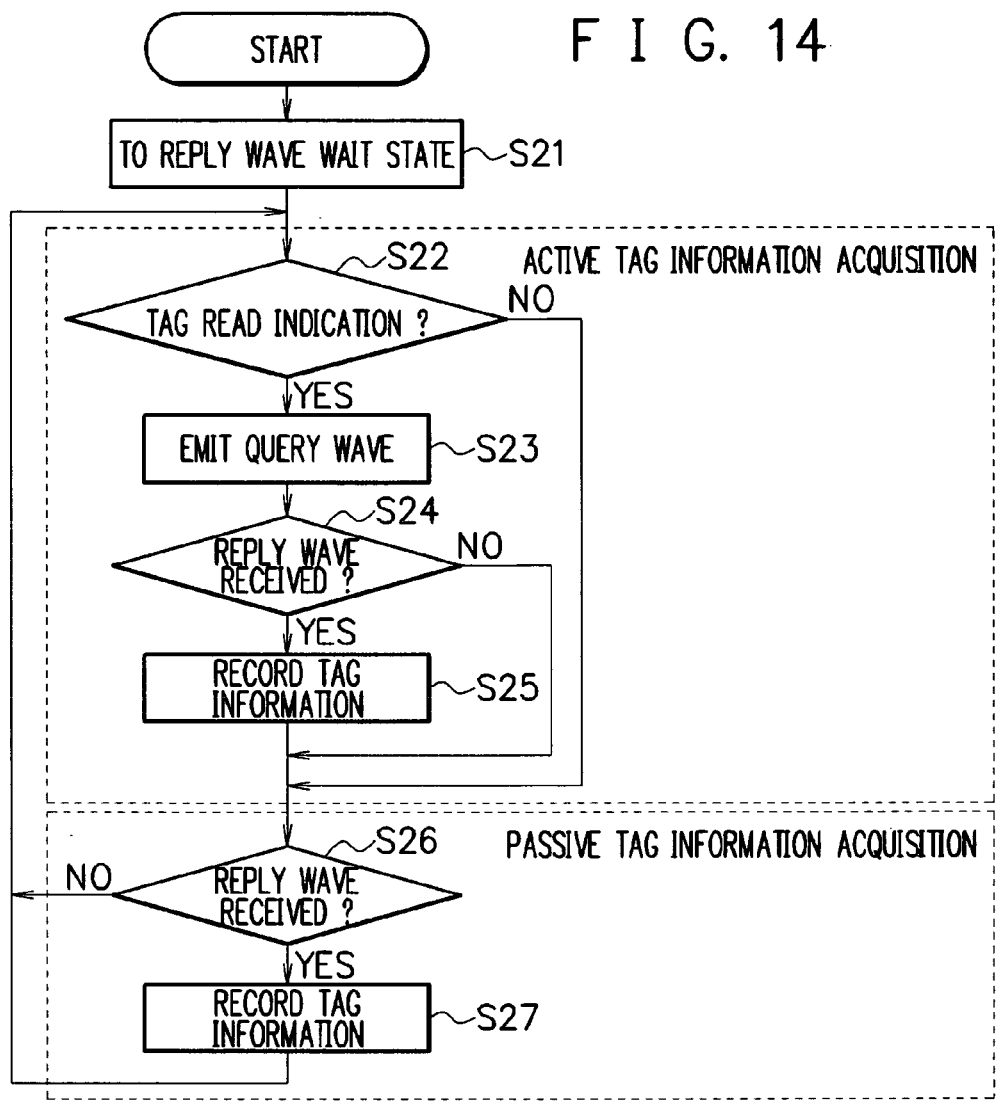
FIG. 14 is a flowchart showing an example of operation of a reader employed in a fifth embodiment.

FIG. 14 shows an operation procedure example of a reader adopted in the fifth embodiment of the tag information acquisition system. The operation of the reader includes active tag information acquisition processing and passive tag information acquisition processing. When the reader is powered, the reader immediately enters a reply wave wait state (step S21). In the active tag information acquisition processing, when a tag read indication is received from the input section (yes in step S22), the reader emits a query wave (step S23) to attempt to acquire tag information (steps S24 and S25). If a reply wave is received (step S26), the reader records tag information thereof (step S27). Otherwise (no in step S22), the reader executes only the passive tag information acquisition processing. The reader waits for an event in which an RF tag emits a reply wave in response to a query wave from another reader (steps S26 and S27).

Figure 15:
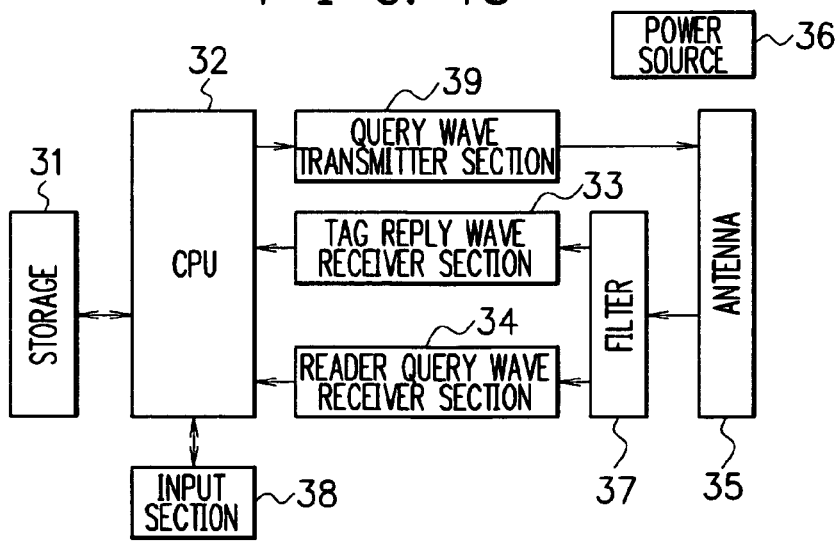
FIG. 15 is a block diagram showing an example of a hardware configuration adopted in the fifth embodiment.

To receive a reply wave sent from an FR tag in response to a query wave emitted from another reader, the reader enters a reply wave wait state in any case as in the first embodiment. However, it is also possible for the reader to enter a reply wave wait state as in the second, third, or fourth embodiment. FIG. 15 shows a hardware configuration of the reader that enters a reply wave wait state in a manner similar to that of the second embodiment. A query wave transmitter section 39 corresponds to the transmitter section 28 of the reader 2 in the fourth embodiment. On the other hand, when the reader enters a reply wave wait state which is almost the same as that of the third embodiment, the reader includes two input sections, i.e., an input section to emit a query wave and an input section to enter a query wave wait state. For the transmitter section 39, there may be employed a general RFID reader including a query wave transmitter section and a reply wave receiver section. The RFID reader may include terminals such as a personal data assistant, a personal computer, and a cellular phone.

The fifth embodiment leads to an advantage to guarantee acquisition of tag information when compared with the case where among a plurality of readers, each reader receives reply waves in response to the query wave emitted from the reader.

Sixth Embodiment

The sixth embodiment includes, in addition to the functions of the fifth embodiment, an additional function for each reader. That is, each reader receives query waves from other readers. Described is a case in which when a reader receives a query wave from another reader, the reader does not emit a query wave for a fixed period of time.

The sixth embodiment has a hardware configuration similar to that of the reader of the fifth embodiment shown in FIG. 15. However, these embodiments mechanically differ from each other, which will be described below.

Figure 16:
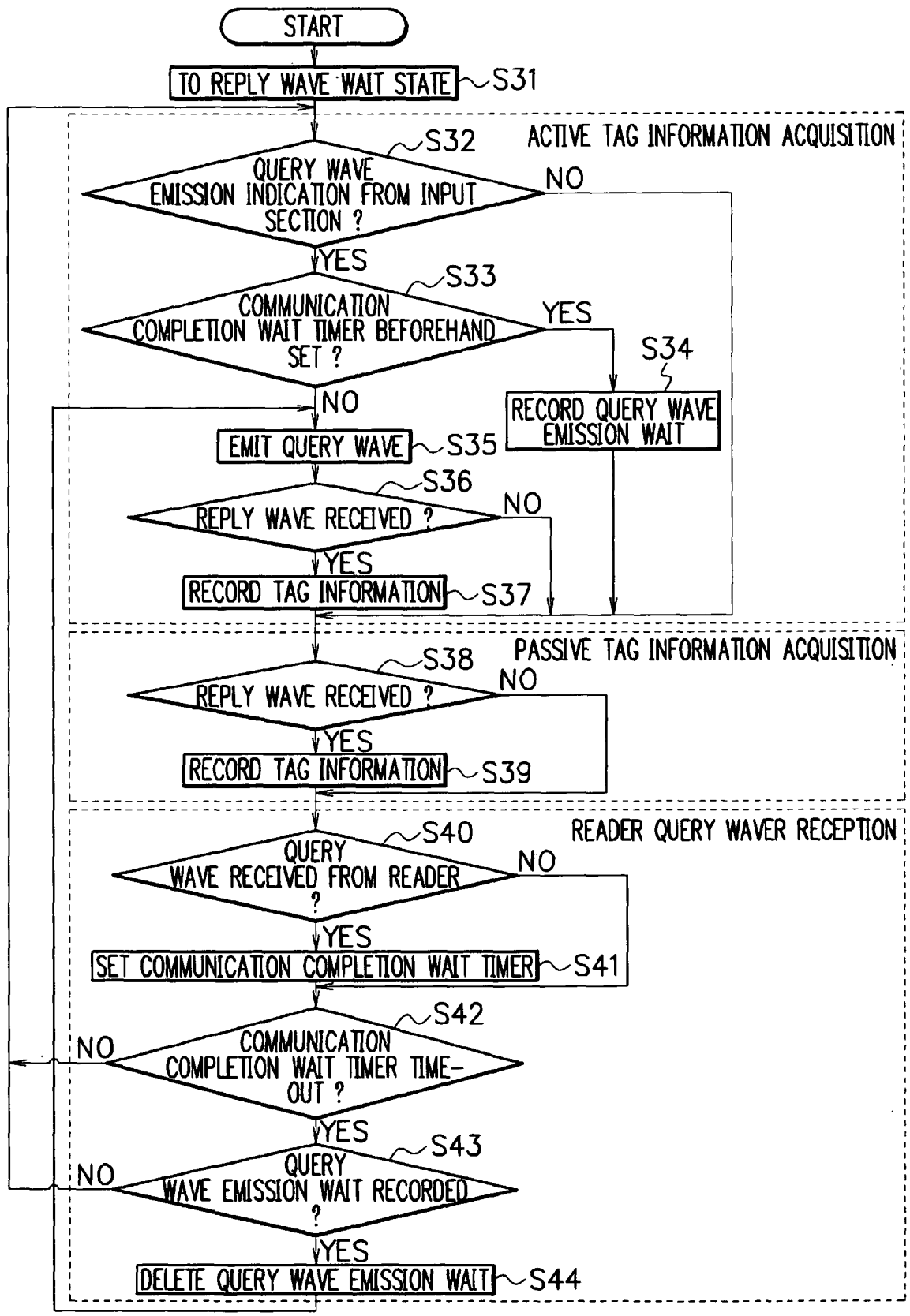
FIG. 16 is a flowchart showing an example of an operation procedure of a reader utilized in a sixth embodiment.

FIG. 16 shows an operation flow of a reader used in the sixth embodiment. When the reader is activated, the reader enters a reply wave wait state (step S31). The reader then executes active tag information acquisition processing (steps S32 to S37), passive tag information acquisition processing (steps S38 and S39), and reader query wave reception processing (steps S40 to S44). In the active tag information acquisition processing, the reader emits a query wave (step S35) to acquire tag information. In the passive tag information acquisition processing, the reader receives a response wave emitted from a tag in response to a query wave from another reader (yes in step S38) to thereby acquire tag information (step S39). In the reader query wave reception processing, when a query wave from another reader is received (yes in step S40), the reader executes processing in which the reader does not emit a query wave for a predetermined period of time (steps S41 and S42).

When a query wave from another reader is received (yes in step S40), the reader query wave reception processing section sets a communication completion wait timer to suppress emission of query waves until the reader completely finishes the communication (step S41). If a query wave is received again from another reader (yes in step S40) before the time runs out (no in step S42), a timer is reset (step S41) and the timer starts again upon receipt of the latest query wave. If the time-out occurs (yes in step S42), the reader checks whether "query wave emission wait" has been recorded (step S43). A condition to record "query wave emission wait" will be described later. If it has been recorded (yes in step S43), the reader deletes the record (step S44) and the process goes to the active tag information acquisition processing to emit a query wave (step S35).

In the active tag information acquisition processing, if a query wave output instruction is received from an input section 38 (yes in step S32), the reader checks whether a communication wait timer has been set (step S33). If the timer has been set (yes in step S33), the reader records "query wave emission wait" (step S34) to thereby terminate the processing in the active tag information acquisition processing section. Otherwise (no in step S33), the reader emits a query wave (step S35). If a reply wave is received (yes in step S36), the reader records tag information of the received wave (step S37). In the passive tag information acquisition processing, the reader waits for a reply wave (step S38). If a reply wave is received, the reader records tag information of the received wave (step S39).

Japanese Patent Application Laid-Open No. 2003-150916 describes a conventional technique similar to the sixth embodiment. According to the invention of JP 2003-150916, as a signal to set a reader to a sleep state in which the reader does not emit a query wave is defined as "sleep request signal", which is different from the query wave to read tag information. The conventional technique differs in this point from the sixth embodiment. That is, to implement the invention of JP 2003-150916, there is required a mechanism to discriminate the sleep request signal from the query wave. However, the sixth embodiment does not require such a configuration.

The sixth embodiment leads to, in addition to the advantage of the fifth embodiment, an advantage in which when a reader is reading information, nearby readers do not start the read processing.

Seventh Embodiment

In the seventh embodiment, the reader includes, in addition to the functions of the reader adopted in the fifth embodiment, a function equivalent to the RF tag. In the seventh embodiment, each reader is restricted in a way that when a reply wave is received from another reader, the reader does not emit a query wave for a fixed period of time.

FIG. 17 shows a hardware configuration example of a reader used in the seventh embodiment. The seventh embodiment includes, in addition to the constituent components of the sixth embodiment, a reply wave transmitter section 40. The section 40 receives data from the CPU section 32 and modulates the data to deliver resultant data to the antenna 35.

Figure 18:
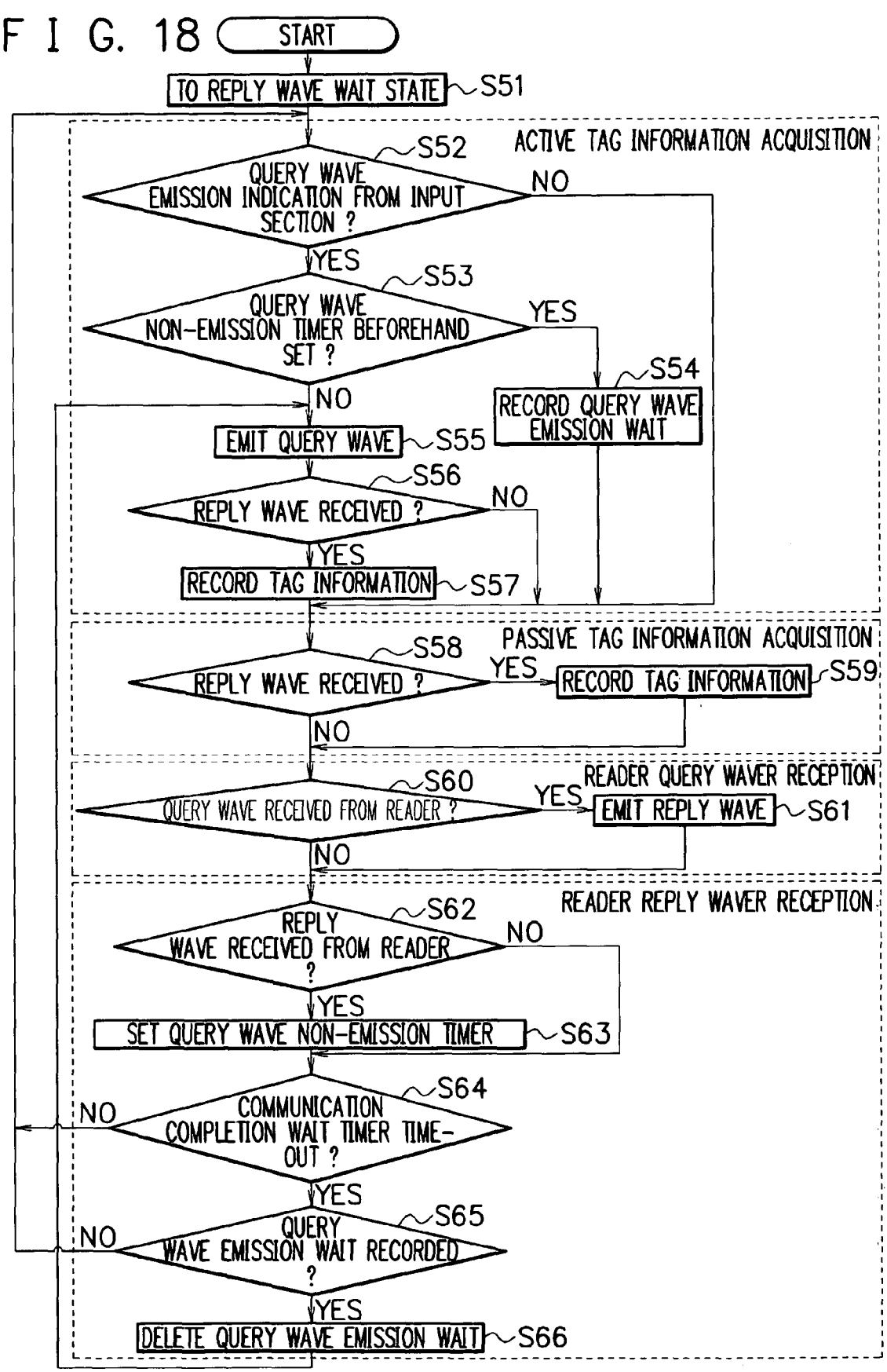
FIG. 18 is a flowchart showing an example of an operation procedure of a reader adopted in the seventh embodiment.

FIG. 18 shows an operation flow diagram of a reader employed in the seventh embodiment. Compared with the sixth embodiment including a reader which does not emit a query wave for a predetermined period of time when a query wave is received from another reader, the seventh embodiment includes a reader which does not emit a query wave for a fixed period of time (steps S63) after a reply wave is received from another reader (steps S51 to S62). When activated, the reader enters a reply wave wait state (step S51). Thereafter, the reader executes active tag information acquisition processing (steps S52 to S57), passive tag information acquisition processing (steps S58 and S59), reader query wave reception processing (steps S60 to S61), and reader reply wave reception processing (steps S62 to S66). In the active tag information acquisition processing, the reader emits a query wave (step S55) and thereby acquires tag information (step S57). In the passive tag information acquisition processing, the reader receives a reply wave emitted from a tag in response to a query wave from another reader (step S58) to resultantly acquire tag information (step S59). In the reader query wave reception processing, when a reply wave from another reader is received (step S60), the reader emits a reply wave (step S61). The reply wave includes an identifier indicating that the wave is a reply wave emitted from the reader.

In the reader reply wave reception processing, when a reply wave is received from another reader (step S62), the reader executes processing in which the reader does not emit a query wave for a predetermined period of time (steps S63 and S64).

In the reader reply wave reception processing, when a reply wave is received from a reader (yes in step S62), the reader sets a query wave non-emission timer (step S63). If a reply wave is received again from another reader (yes in step S56) before the time runs out (no in step S64), the reader resets the timer and re-measures time upon receipt of a subsequent reply wave. When the timer notifies time-out (yes in step S64), the reader checks whether "query wave emission wait" has been recorded (step S65). If it has been recorded (yes in step S65), the process goes to the active tag information acquisition processing in which the reader emits a query wave (step S55).

The active tag information acquisition processing of FIG. 18 is implemented by replacing the processing of step S33 (a check for the setting of the communication completion wait timer) in the active tag information acquisition processing of FIG. 16 with the processing of step S53 (a check for the setting of the query wave non-emission timer). The passive tag information acquisition processing of FIG. 18 is similar to that shown in FIG. 16. The reader query wave reception processing of the flowchart shown in FIG. 18 is executed in a following stage of the passive tag information acquisition processing similar to the flowchart shown in FIG. 16. The reader reply wave reception processing includes determination of reception of a query wave from a reader (step S60) and emission of a reply wave (step S61).

The seventh embodiments leads to, in addition to the advantage similar to that of the fifth embodiment, an advantage of reducing interference between query waves of the respective readers for the following reason. After the reader under consideration finishes a tag information read operation, if there exist nearby readers, the pertinent reader suppresses emission of a query wave therefrom.

Eighth Embodiment

For the eighth embodiment, described is a case in which a reader control server is arranged to control readers arbitrarily distributed. FIG. 19 shows a configuration of the eighth embodiment of a tag information acquisition system. The system of FIG. 19 includes a plurality of readers arbitrarily distributed and a reader control server to control the readers. The readers are linked via, for example, a Local Area Network (LAN) with the reader control server.

FIG. 20 shows a hardware configuration example of the eighth embodiment. In addition to the constituent components of the reader 2 of the fourth embodiment shown in FIG. 11, the reader of the eighth embodiment includes an external interface 29. The external interface 29 is an interface such as an IEEE802.11 wireless LAN, ethernet (registered trademark), or Bluetooth. The readers are coupled via the external interface 29 with the network.

The reader control server has a function to assign read timing to each reader to thereby control information regarding read timing thereof.

FIG. 21 shows an operation flow of a reader utilized in the eighth embodiment. Compared with the reader of the fifth embodiment which emits a query wave immediately upon reception of a query wave emission instruction from the input section (step S23), the reader of the eighth embodiment acquires query wave emission timing from the reader control server (step S73) upon reception of a query wave emission instruction from the input section (step S72). According to the timing, the reader emits a query wave to resultantly acquire tag information. Also before the query wave emission timing, the reader can receive a reply wave from a tag. The other operations are similar to those of the reader of the fifth embodiment.

FIG. 22 shows a flow of operation of the reader control server. The server waits for a query wave emission timing request from a mobile reader (step S81). Having received the request (yes in step S81), the server refers to query wave emission timing of the other readers to calculate query wave emission timing (step S82). As a calculation method, it is possible to assign an earliest point of time at which no other reader conducts a read operation. The server sends the calculated timing to the reader having issued the request (step S83) and records the timing in a storage area or a memory, i.e., temporary storage in a CPU. The recorded data is referred to when a query wave emission timing request is received from another reader. Also, the reader sets a query wave emission timing deletion timer (step S85) for the following reason. The reader deletes, after emitting a query wave, the record of the query wave emission timing thereof recorded in the reader control server (steps S86 and S87). In accordance with the eighth embodiment, the readers can emit respective query waves without causing collisions therebetween.

Ninth Embodiment

Figure 23:
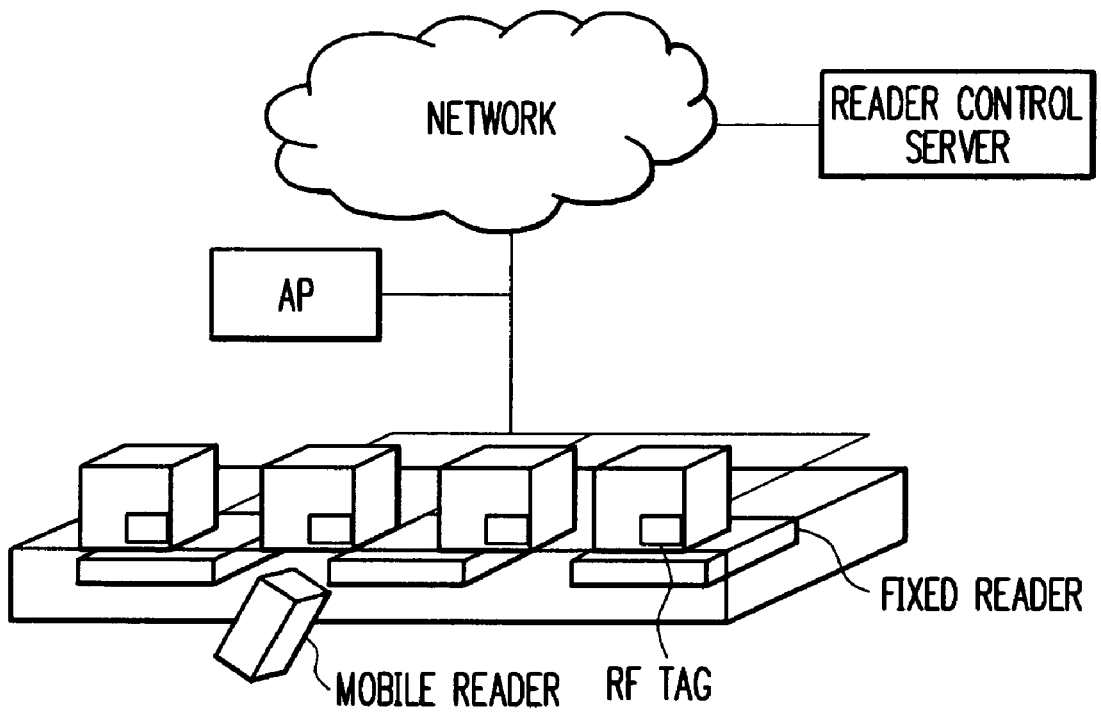
FIG. 23 is a schematic diagram showing an example of a system configuration applied to a ninth embodiment.

FIG. 23 shows a construction of the ninth embodiment in accordance with the present invention. Although the configuration is almost same as that of the eighth embodiment, the ninth embodiment includes either one of the following two kinds of readers.
1) Reader fixedly installed (fixed reader): Read period is set to avoid collision with a query wave of another reader.
2) Freely moving reader (mobile reader)

The fixed reader is adopted to attain information of tags with a wide read range. The mobile reader is employed, when tag information exists at a particular place or when a particular tag exists at a particular place, to obtain the tag information.

The ninth embodiment is configured on the assumption that the embodiment is employed in a store. That is, it is assumed in the ninth embodiment that a fixed reader is installed in a display rack of a store, and a customer carries out a mobile reader.

The ninth embodiment shown in FIG. 23 includes fixed readers, mobile readers, a reader control server, and an Access Point (AP).

Figure 24:
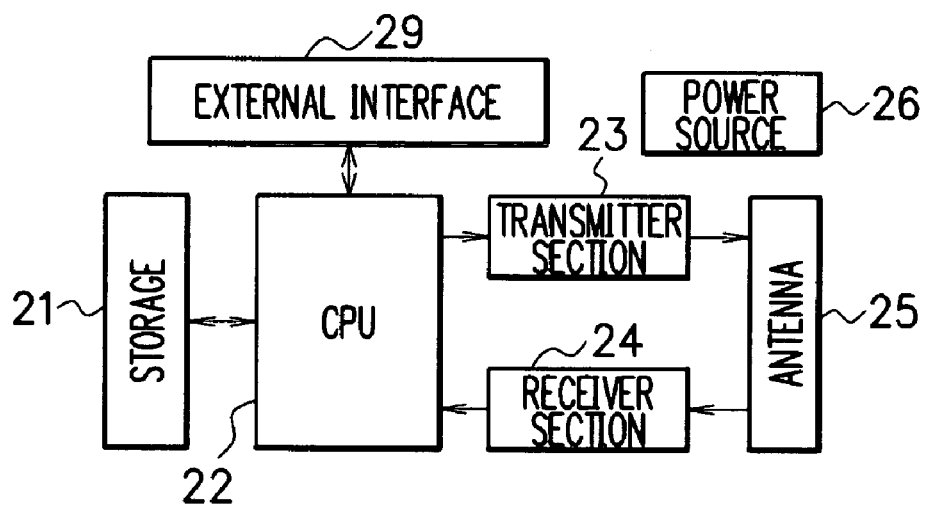
FIG. 24 is a block diagram showing an example of a hardware configuration of a fixed reader.

The fixed readers are set to emit a query wave with a predetermined period to avoid collision therebetween. The mobile reader has hardware similar to that of the reader of the eighth embodiment. FIG. 24 shows an example of a hardware configuration of the fixed reader. The reader adopted as a fixed reader in the ninth embodiment has a configuration implemented by removing the input section 28 from the reader of the eighth embodiment shown in FIG. 20.

Description of Ninth Embodiment

Figure 25:
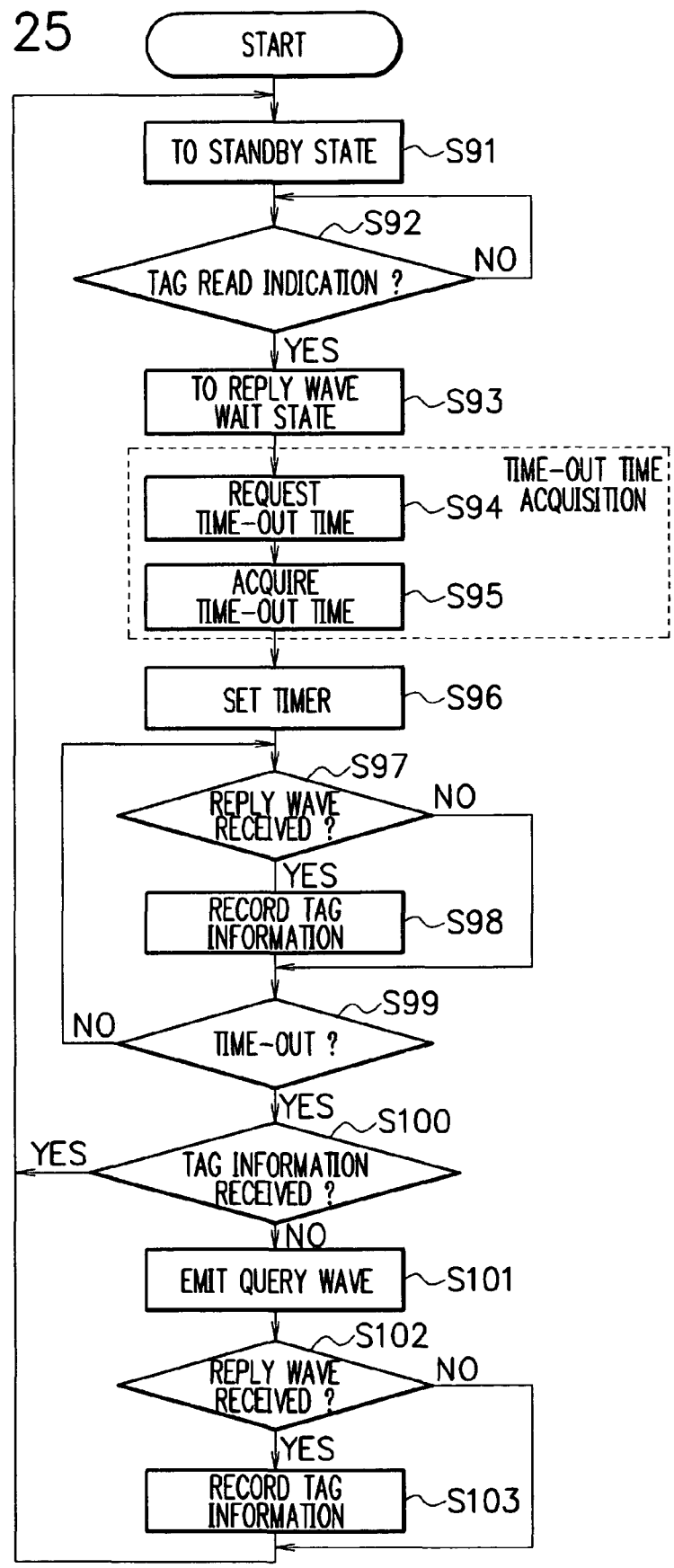
FIG. 25 is a flowchart showing an example of operation of a mobile reader adopted in the ninth embodiment.

FIG. 25 shows an operation flow of a mobile reader utilized in the ninth embodiment. The embodiment includes time-out time acquisition processing in addition to the processing procedure of the reader adopted in the fourth embodiment shown in FIG. 12. In response to a tag read instruction (yes in step S92), the mobile reader enters a reply wave wait state (step S93) and then issues a time-out time request (step S94) to the reader control server. Having received a time-out time as a reply (step S95), the mobile reader sets the time to a timer (step S96). Subsequent processing is similar to that of the reader of the fourth embodiment.

Figures 26, 27, 28:
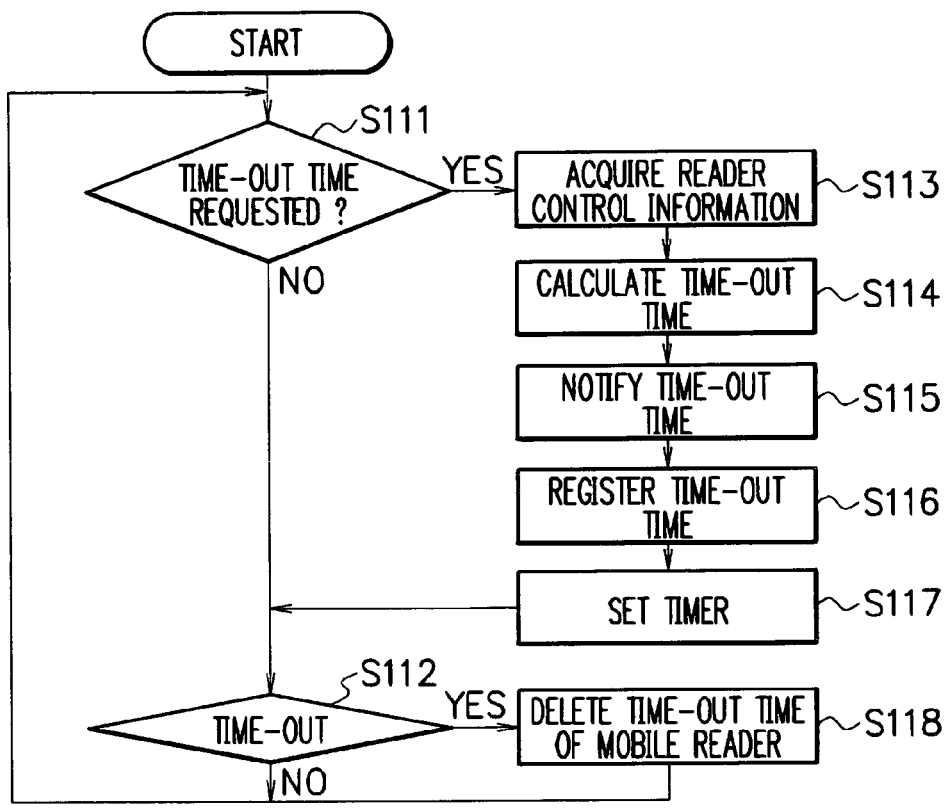
FIG. 26 is a flowchart showing an example of an operation procedure of a reader control server employed in the ninth embodiment.
FIG. 27 is a table showing an example of reader control information used in the ninth embodiment.
FIG. 28 is a table showing an example of reader control information adopted in the ninth embodiment.

FIG. 26 shows an operation flow of the reader control server. The server waits for a time-out time request from a mobile reader (step S111). When the request is received from a mobile reader (yes in step S111; S113), the server refers to reader control information to calculate a time-out time (step S114). The reader control information is information regarding the reader read time such as a read period of the fixed reader and a time-out time of the mobile reader. After the time-out time is calculated, the server notifies the time as a reply to the mobile reader (step S115). The time is stored such that when a time-out time request is received from a mobile reader, the time is used to calculate a time-out time (step S116).

Assume, for example, a case in which the reader control server keeps information shown in FIG. 27 as reader control information. Data of FIG. 27 includes records each of which including an identifier (ID), a reference time, and a period. A fixed or mobile reader having an identifier indicated by the ID field emits a query wave with a period of the period field according to a reference time indicated by the reference field. For a record in which the period field is empty, the reader emits a query wave only once at the reference time. In a case in which a time-out time request is received from a reader designated by an ID 201 and the time is calculated as 450 milliseconds (ms) thereafter, the reference time of the ID 201 is recorded as 450 ms in the reader control information. After the time-out time is assigned, the readers set to a timer a time obtained by adding a period of time lapsed after the tag read time to the time-out time (step S117). When the timer notifies occurrence of a time-out event (yes in step S112), the reader discards the time-out time kept for the mobile reader (step S118).

Figure 29:
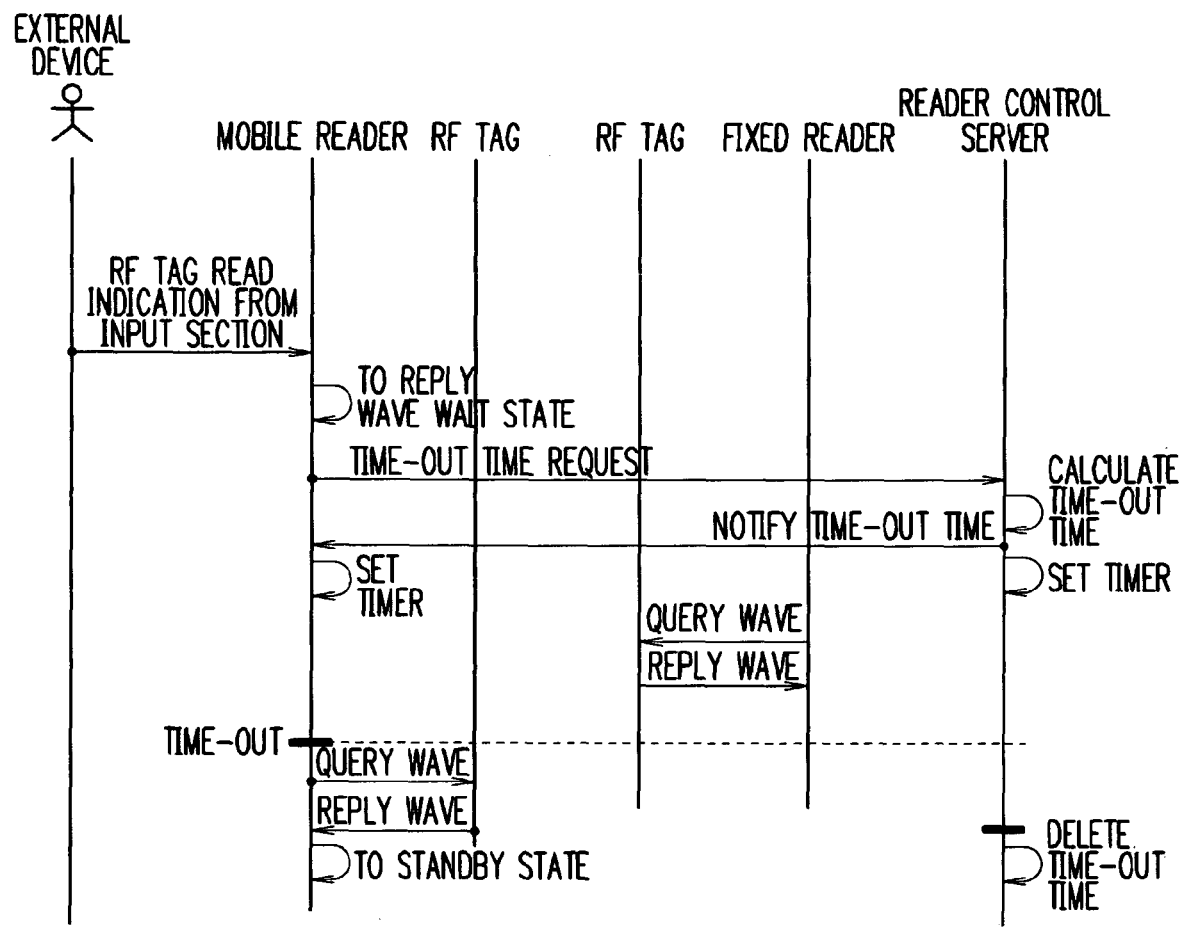
FIG. 29 is a flowchart showing an example of a procedure for a mobile reader to acquire RF tag information.

FIG. 29 shows an example of a procedure for a mobile reader to attain RF tag information. At reception of an RF tag read instruction from the input section, the mobile reader enters a reply wave wait state and delivers a time-out time request to the reader control server. In response to the request, the server calculates a time-out time. The time is other than a time at which another reader conducts a read operation. The server sends the time to the mobile reader as the request transmission source and to a timer a time obtained by adding a period of time lapsed after the tag read time to the time-out time. When the time is received, the mobile reader sets the time to a timer. After the timer indicates a time-out event, the mobile reader has received no tag information in this situation. Therefore, the mobile reader emits a query wave to obtain tag information from an RF tag. After the tag information read processing, the timer of the server notifies a time-out event and the time-out time is deleted. The mobile reader enters a standby state after acquisition of tag information.

Figure 30:
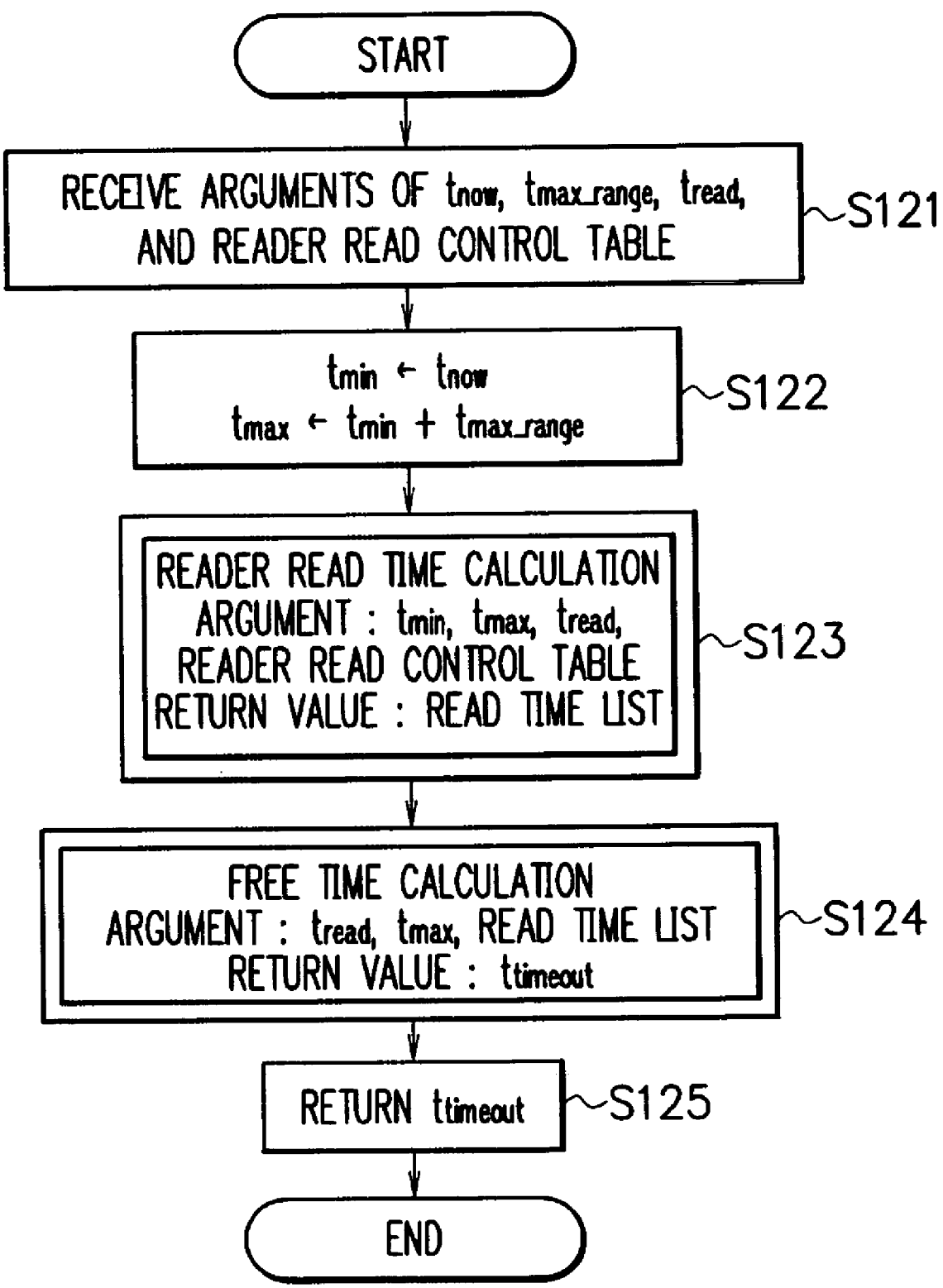
FIG. 30 is a flowchart showing an example of a procedure of an algorithm.

FIG. 30 shows an algorithm of processing to calculate a time-out time. This is an example of the algorithm and the present invention is not restricted by this method. The program receives arguments such as $t_{now}$, $t_{max\_range}$, $t_{read}$, and reader read control table (step S121). In the arguments, "$t_{now}$" is a present or current time. "$t_{max\_range}$" is a range to specify a time-out time. "$t_{now}+t_{max\_range}$" is a maximum value of a specifiable time-out time. "$t_{read}$" is a period of time required for a reader to read an RF tag. "reader read control table" is a table including items of "reference time" and "period" like the information items shown in FIG. 27.

First, the minimum value $t_{min}$ of time up to a specifiable time-out time is set as $t_{now}$ and the maximum value $t_{max}$ of time up to a specifiable time-out time is set as $t_{now}+t_{max\_range}$ (step S122). Next, the program calls a reader read time calculation program and generates a read time list including a read time for each reader by use of the reader read time table (step S123). Next, the program calls a free time calculation program and obtains a nearest time $t_{timeout}$ which can secure $t_{read}$ time and which is not used by any reader for a read operation by using the read time list (step S124). This is notified as a time-out time to the reader (step S125).

FIG. 31 shows an example of a flow of the reader read time calculation program. The program receives arguments such as $t_{min}$, $t_{max}$, $t_{read}$, and a reader read control table (step S131). To register a reader read time, the program generates an empty read time list (LIST; step S132). FIG. 32 shows an example of the read time list. The list includes elements arranged in an ascending order. Each element includes time $t_{start}$ from the current time to the time for the reader to start a read operation and time $t_{end}$ from the current time to the time for the reader to finish the read operation.

Subsequently, the program reads the first row of the reader read control table to attain therefrom information of the period (step S134). If no reader has been registered to the table (no in step S133), the program returns an empty read time list (LIST) as a return value (step S139). After obtaining the row, the program calls a reader read time list creation program using $t_{basis}$ as a reference time and $t_{period}$ as a period to thereby generate a read time list (TmpLIST) for the reader (step S135). If the period has not been registered, $t_{period}$ is set to "0". Next, the program calls a read time list merge program to merge the created read time list (TmpLIST) with a summarized list obtained by collecting the read time lists used up to this point of time (step S136). The merged list is registered as LIST. Assume, for example, that FIG. 32 shows LIST before the merge and FIG. 33 shows TmpLIST before the merge. Then, FIG. 34 shows LIST after the merge. The processing is repeatedly executed for all readers registered to the reader read control table. When the reader read time lists are created for all readers registered to the reader read control table, the program returns the read time list (LIST) and then terminates the processing.

Figure 35:
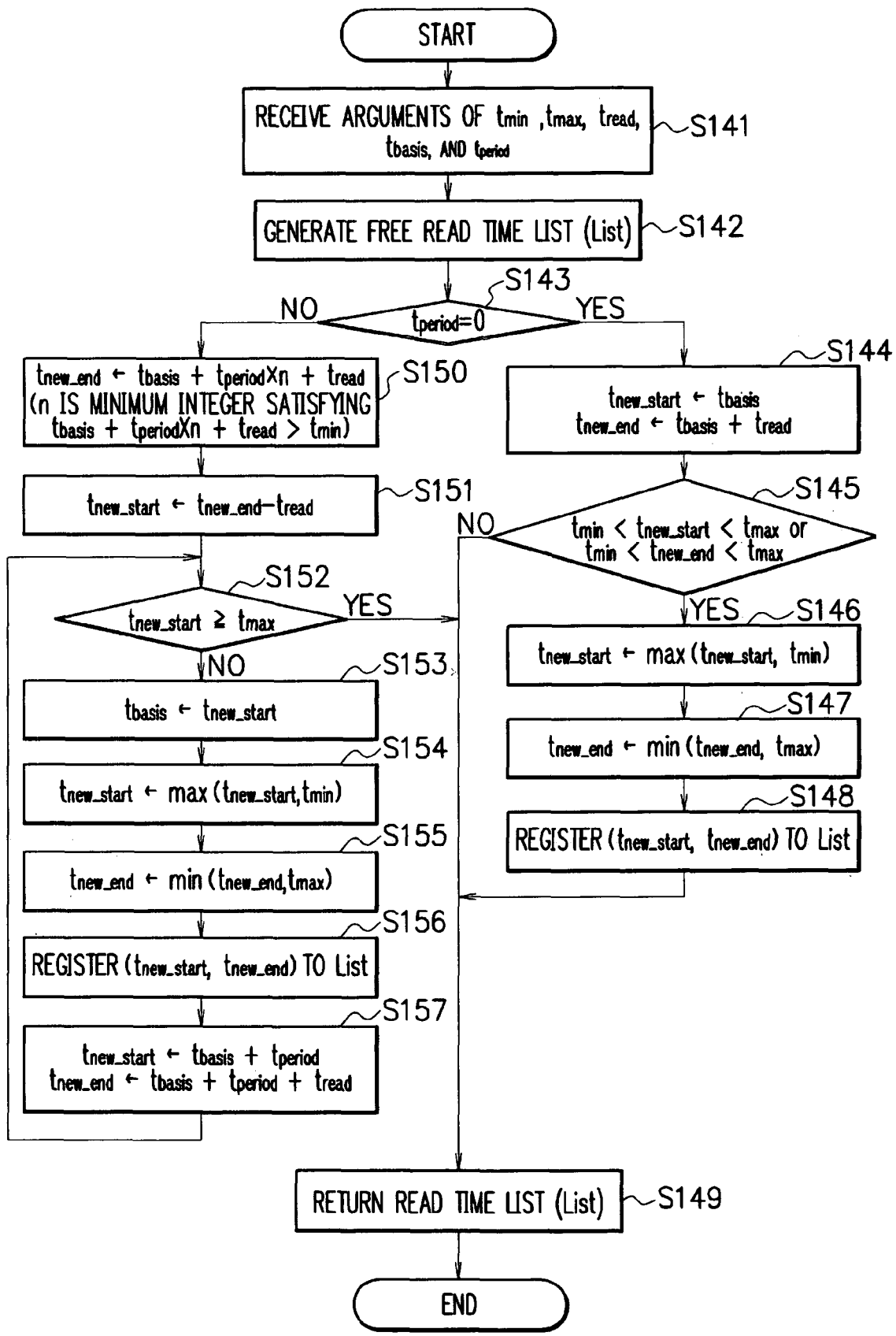
FIG. 35 is a flowchart showing a flow of a reader read time list generation program.

FIG. 35 shows a flow of the reader read time list creation program. The program receives arguments including $t_{min}$, $t_{max}$, $t_{read}$, $t_{basis}$, and $t_{period}$ (step S141). To register a read time for the reader, the program creates an empty read time list (LIST; step S142). Next, the program checks $t_{period}$ (step S143).

If $t_{period}$ is "0" (yes in step S143), the program sets $t_{basis}$ to $t_{new\_start}$ and $t_{basis}+t_{read}$ to $t_{new\_end}$ (step S144). If the range specified by ($t_{new\_start}$, $t_{new\_end}$) is within ($t_{min}$, $t_{max}$), i.e., if "no" in step S145, the program registers the range to LIST (step S149). However, if only part of the range specified by ($t_{new\_start}$, $t_{new\_end}$) is within ($t_{min}$, $t_{max}$), i.e., if "yes" in step S145, the part of the range is separated and registered to LIST. That is, if $t_{new\_start} < t_{min}$, $t_{min}$ is assigned to $t_{new\_start}$ (step S146). If $t_{new\_end} > t_{max}$, $t_{max}$ is assigned to $t_{new\_end}$ (step S147). The program then registers ($t_{new\_start}$, $t_{new\_end}$) to LIST (step S148). In FIG. 35, max(x,y) indicates a larger value of x and y, and min(x,y) is a smaller value of x and y.

If $t_{period}$ is other than "0" (no in step S143), a read time within ($t_{min}$, $t_{max}$) is registered to LIST for each period. First, the program sets $t_{basis}+t_{period}\cdot n+t_{read}$ (n is a minimum integer satisfying $t_{basis}+t_{period}\cdot n+t_{read} > t_{min}$) to $t_{new\_end}$ (step S150) and $t_{new\_end}-t_{read}$ to $t_{new\_start}$ (step S151). If $t_{new\_start} \geq t_{max}$ (yes in step S152), the program returns LIST and terminates the processing (step S149). Otherwise (no in step S152), the program registers ($t_{new\_start}$, $t_{new\_end}$) to LIST (step S156). However, if only part thereof is contained, the part is separated and registered. That is, if $t_{new\_start} < t_{min}$, $t_{min}$ is assigned to $t_{new\_start}$ (step S154). If $t_{new\_end} > t_{max}$, $t_{max}$ is assigned to $t_{new\_end}$ (step S155). The program then registers ($t_{new\_start}$, $t_{new\_end}$) to LIST (step S156). However, $t_{new\_start}$ is a reference value of the read timing, the program assigns $t_{new\_start}$ to $t_{basis}$ to save its value (step S153).

After having registered ($t_{new\_start}$, $t_{new\_end}$) to LIST, the program sets $t_{basis}+t_{period}$ to $t_{new\_start}$ and $t_{basis}+t_{period}+t_{read}$ to $t_{new\_end}$ (step S157) and then determines whether or not $t_{new\_start} \geq t_{max}$ (step S152). After this point, the program executes processing similar to that described above.

FIG. 36 shows a flow of the read time list creation program. The program receives arguments, i.e., read time lists LIST1 and LIST2 (step S161). First, the program generates a read time list (LIST) for merging operation (step S162). LIST is empty in the initial state. If LIST1 and LIST2 are also empty (no in step 163), the program returns LIST and terminates the processing (step S164). If at least an element has been registered to the lists (yes in step S163), the program acquires either one of the first elements respectively of LIST1 and LIST2 which has a smaller read start time value and then registers the first element to LIST (step S165). However, if one of the first elements is empty, the other one thereof is unconditionally registered to LIST.

If LIST1 and LIST2 contain no element (no in step S166), the program returns LIST and terminates the processing (step S164). If at least an element has been registered to the lists (yes in step S166), the program acquires either one of the first elements respectively of LIST1 and LIST2 which has a smaller read start time value and then sets the read start time to $t_{tmp\_start}$ and the read end time to $t_{tmp\_end}$ (step S167). For the last element of LIST, the program sets the read start time to $t_{start}$ and the read end time to $t_{end}$ (step S168).

Thereafter, the program compares ($t_{tmp\_start}$, $t_{tmp\_end}$) with ($t_{start}$, $t_{end}$) in step S169. If $t_{tmp\_end} < t_{end}$ ($t_{tmp\_end} < t_{end}$ in step S169), the program takes no action for LIST. If $t_{tmp\_start} < t_{end}$ and $t_{tmp\_end} > t_{end}$ ($t_{tmp\_start} < t_{end}$ and $t_{tmp\_end} > t_{end}$ in step S169), the program deletes the last element of LIST and registers ($t_{start}$, $t_{tmp\_end}$) thereto (step S171). If $t_{tmp\_start} > t_{end}$ ($t_{tmp\_start} > t_{end}$ in step S169), the program registers ($t_{tmp\_start}$, $t_{tmp\_end}$) to LIST (step S170). The program repeatedly executes the above processing until all elements of LIST1 and LISY2 are processed. If LIST1 and LIST2 contain no element, the program returns LIST and terminates the processing.

Figure 37:
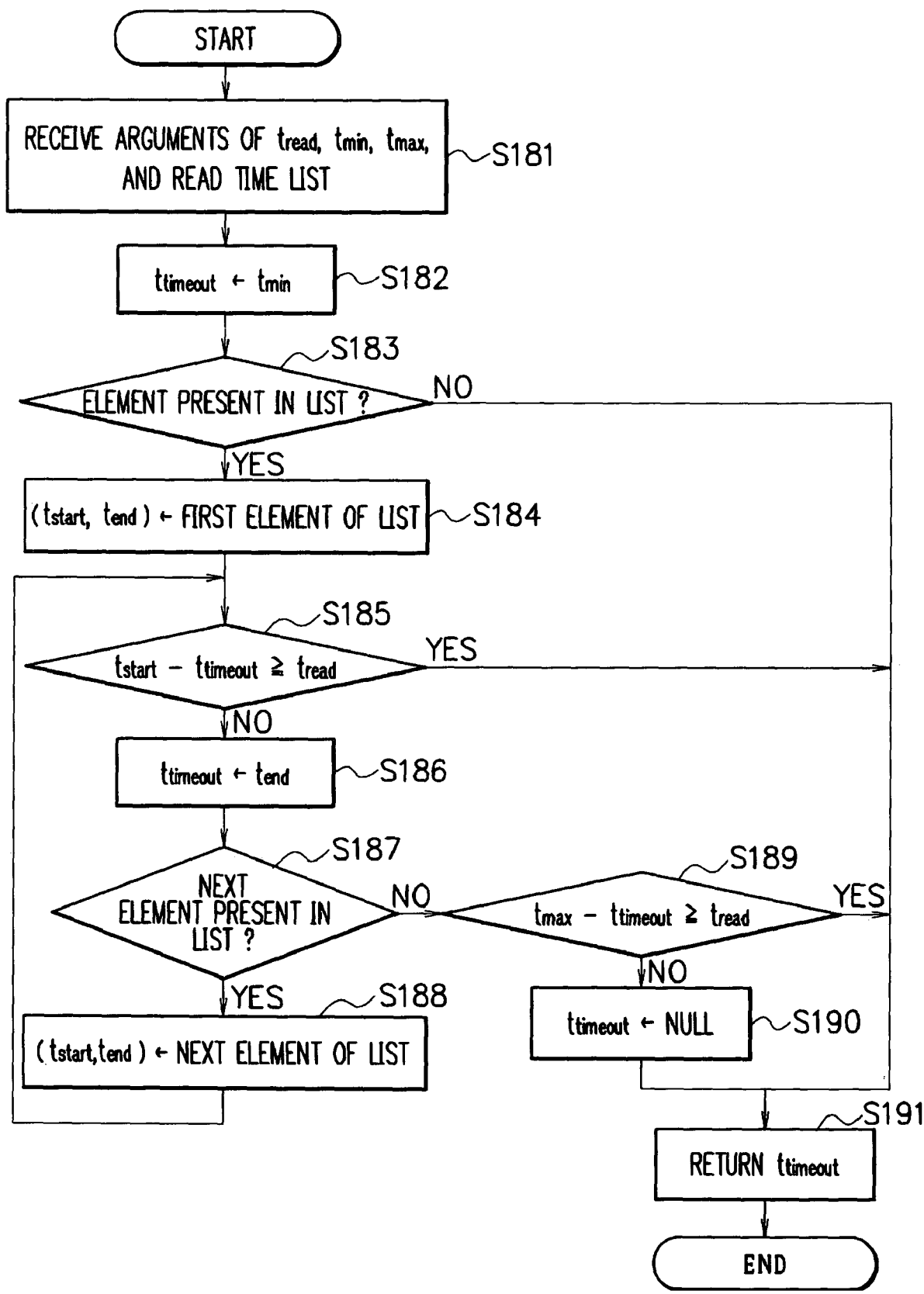
FIG. 37 is a flowchart showing a flow of a free time calculation program.

FIG. 37 shows a processing flow of the free time calculation program. The program receives arguments including $t_{read}$, $t_{min}$, $t_{max}$, and a read time list (step S181). The program assigns $t_{min}$ as a time-out time candidate to $t_{timeout}$ (step S182). If the list contains no element (no in step S183), the program returns $t_{timeout}$ as the time-out time (step S191) to thereby terminate the processing. If the list contains at least one element (yes in step S183), the program obtains the first element to set the element as ($t_{start}$, $t_{end}$) in step S184. If a free time equal to or more than tread exists in a period of time from $t_{timeout}$ to $t_{start}$ (yes in step S185), the program returns $t_{timeout}$ as the time-out time (step S191) and terminates the processing. If such a free time does not exist (no is step S185), the program assigns tend as a next time-out time candidate to $t_{timeout}$ (step S186). The program attains a subsequent element from the list and set the element to ($t_{start}$, $t_{end}$). This operation corresponds to "yes" in step S187 and operation of step S188. Thereafter, as described above, the program checks whether the free time equal to or more than $t_{read}$ exists in the period of time from $t_{timeout}$ to $t_{start}$ (step S185). If no element remains in the list (no in step S187), the program checks whether the free time equal to or more than tread exists in the period of time from $t_{timeout}$ to $t_{max}$ (step S189). If such free time exists (yes is step S189), the program returns $t_{timeout}$ as the time-out time (step S191) and terminates the processing. If such free time does not exist (no is step S189), the program returns "null" indicating that the time-out time cannot be designated (step S190) to thereby terminate the processing.

Figures 38, 39:
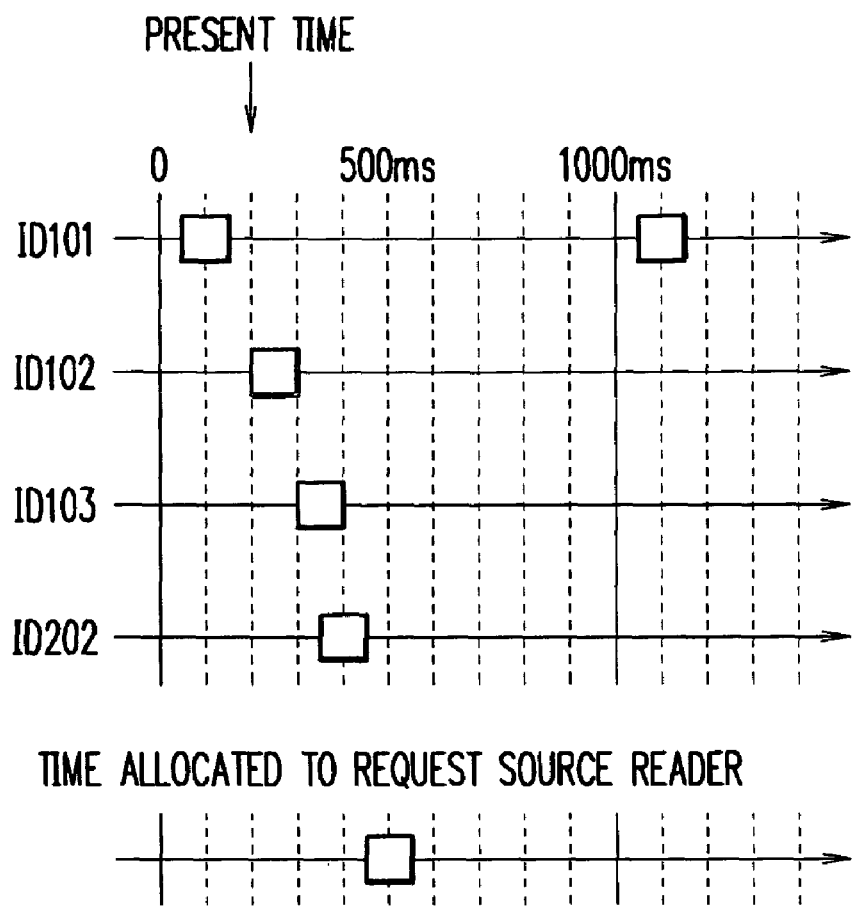
FIG. 38 is a diagram showing an example of time-out time calculation.
FIG. 39 is a table showing an example of a read time list employed as a reader read control table.

FIG. 38 shows an example of the time-out time calculation. Assume that the present time $t_{now}$ is 200 ms from a predetermined point of time, tread is 100 ms, $t_{max\_range}$ is 3000 ms, and the parameters of the reader read control table are as shown in FIG. 39. In this situation, the time-out time is calculated as 450 ms as shown in FIG. 38. This means that after "$t_{now}$", the earliest point of time at which the free time equal to or more than "$t_{read}$" appears is when 450 milliseconds pass after the predetermined point of time.

The ninth embodiment of the tag information acquisition system leads to advantages as below.

1) Tag information can be acquired without causing collision between query waves from the readers.
2) The mobile reader does not emit the query wave and hence can accordingly save electric power.
3) The system can be employed in a store. In this situation, the reader installed in a display rack or showcase for the merchandise management is assumed as a fixed reader and the reader adopted for the customer to obtain merchandise information is regarded as a mobile reader.

Tenth Embodiment

A method of calculating the time-out time other than that of the ninth embodiment is described with reference to the flowchart of FIG. 26. In the tenth embodiment, the time-out time is calculated as an earliest time which is before a point of time at which each fixed reader conducts a subsequent read operation and at which no reader conducts a read operation. In the tenth embodiment, the tag information acquisition system is configured in almost the same way as for the ninth embodiment.

FIG. 40 shows an algorithm of the time-out time calculation used the tenth embodiment. The program receives argument $t_{now}$, $t_{max\_range}$, $t_{read}$, and reader read control table (step S201). The table includes in each entry thereof an identifier (ID), a reference time, a period, and a reader type as shown in FIG. 41. Based on the read type, whether the reader is a fixed reader or a mobile reader can be determined. The program first calls an all reader read time calculation program to calculate a period of time from the present time to a point of time when all readers complete the read operation. The program receives the period of time as $t_{backoff}$ (step S202). The program assigns $t_{now}+t_{backoff}$ to $t_{min}$ and $t_{min}+t_{max\_range}$ to $t_{max}$ (step S203). Thereafter, the program executes processing in almost the same way as the ninth embodiment.

Figure 42:
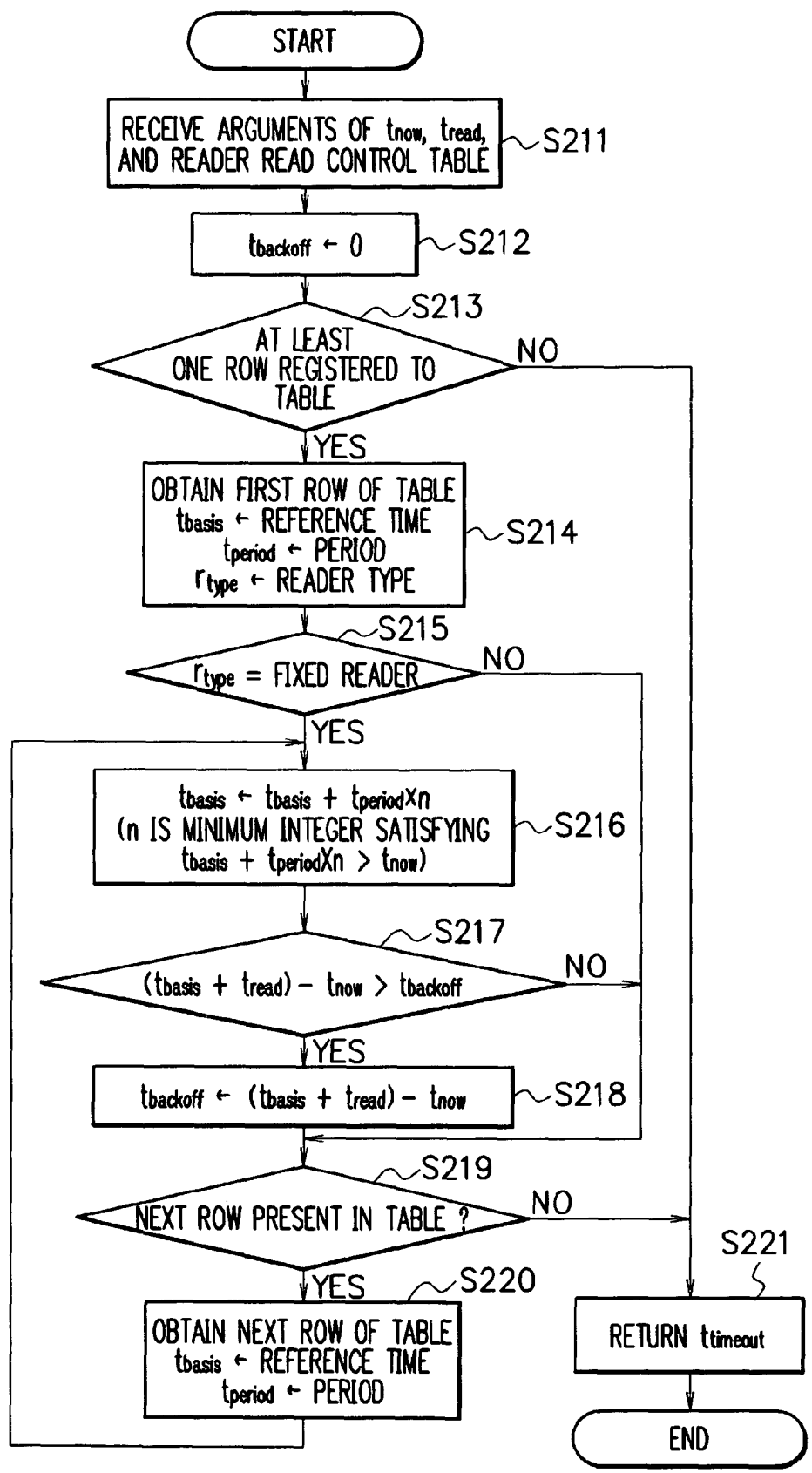
FIG. 42 is a flowchart showing a flow of an algorithm of an all reader read time calculation program.

FIG. 42 shows an algorithm employed in the all reader read time calculation program. The program receives arguments $t_{now}$, $t_{read}$, and reader read control table (step S211). The program assigns "0" to $t_{backoff}$ as a back-off time candidate (step S212). If the table contains no reader read period (no in step S213), the program returns $t_{backoff}$ and then terminates the processing (step S221). If at least one reader read period has been registered to the table (yes in step S213), the program obtains the first row of the table (step S214) and checks whether the reader type is a fixed reader (step S215). If the reader type is not a fixed reader (no in step S215), the program obtains the next row. If the reader type is a fixed reader in this case (yes in step S215), the program attains a subsequent read start time ($t_{basis}+t_{period} \cdot n$; n is a minimum integer satisfying $t_{basis}+t_{period} \cdot n > t_{now}$) according to the reference time and the period and sets the resultant value to $t_{basis}$ (step S216). Thereafter, the program compares the back-off candidate time $t_{backoff}$ with $(t_{basis}+t_{read})-t_{now}$ (step S217). If $t_{backoff}$ is less (yes in step S217), the program assigns $(t_{basis}+t_{read})-t_{now}$ as the back-off time candidate to $t_{backoff}$ (step S218). The program then obtains the next row (yes step S219; S220) and repeatedly executes the above processing (steps S216 to S218). If all rows of the table have been processed (no in step S219), the program returns $t_{backoff}$ and terminates the processing (step S221).

Figure 43:
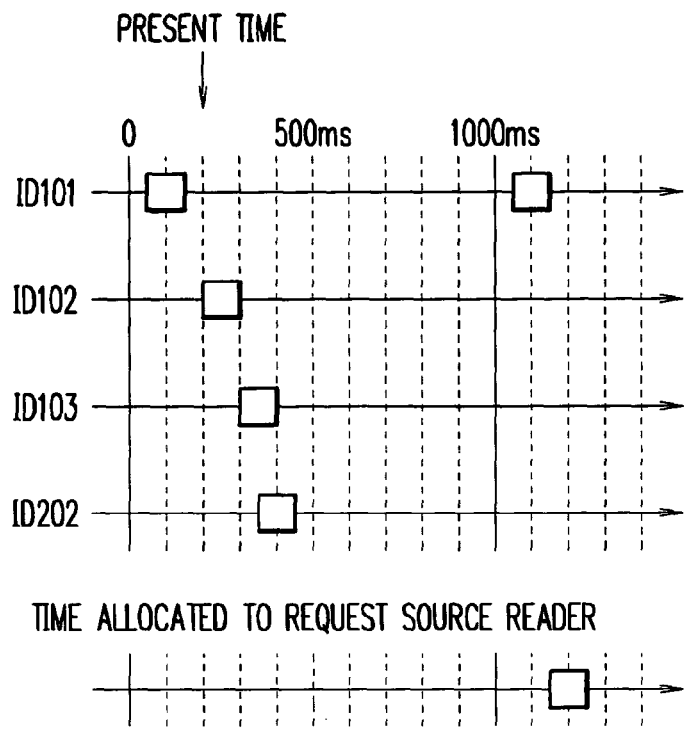
FIG. 43 is a table showing an example of time-out time calculation.

FIG. 43 shows an example of the time-out time calculation. Assume that the present time $t_{now}$ is 200 ms from a predetermined point of time, $t_{read}$ is 100 ms, $t_{max\_range}$ is 3000 ms, and the parameters of the reader read control table are as shown in FIG. 39. In this situation, the time-out time is calculated as 1150 ms as shown in FIG. 43. That is, all fixed readers finish the read operation when 1150 milliseconds lapse after the predetermined point of time. After this point of time, an earliest point of time at which no reader conducts the read operation appears when 1150 milliseconds pass after the predetermined point of time.

In accordance with the tenth embodiment, the time-out calculation time is attained as a period of time equal to or more than a period of time used for all the fixed readers to conduct the read operation. Therefore, when there exists at least one nearby reader, it can be advantageously guaranteed that the reader under consideration assuredly utilizes a query wave from the nearby reader.

Eleventh Embodiment

A time-out time calculation method other than that of the tenth embodiment is described with reference to FIG. 26. It is assumed in the eleventh embodiment that a plurality of channels are available for the query and reply waves to calculate a point of time at which no interference occurs between the readers. The eleventh embodiment is substantially equal in the configuration to the ninth embodiment.

Figure 44:
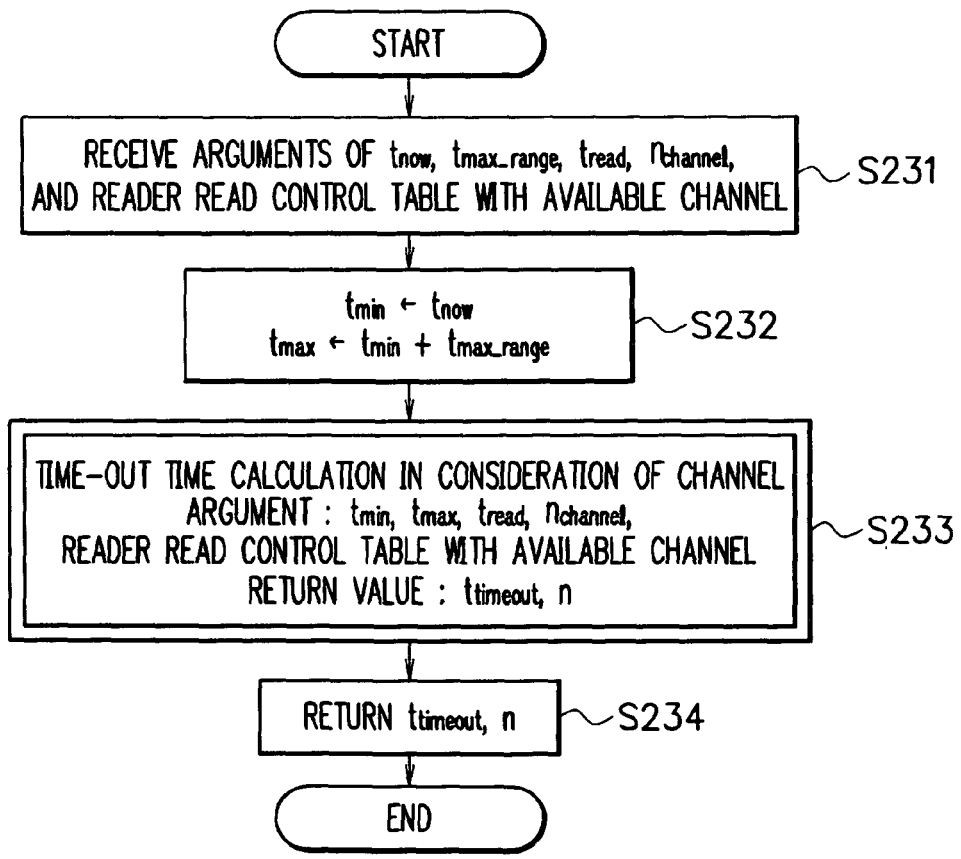
FIG. 44 is a flowchart showing a flow of an algorithm of time-out time calculation in an eleventh embodiment.

FIG. 44 shows an algorithm of the time-out time calculation in he eleventh embodiment. The program receives arguments $t_{now}$, $t_{max\_range}$, $t_{read}$, $n_{channel}$, and reader read control table with available channel (step S231). The table contains an item of a channel in addition to the reference time and the period as shown in FIG. 45. The program first sets $t_{min}$ and $t_{max}$ as in the ninth embodiment (step S232). The program calls a time-out time calculation program to calculate the time in consideration of a channel and attains a time-out time "$t_{timiout}$" and a channel n to be used when the mobile reader conducts a read operation (step S233). The program notifies the information items to the mobile reader (step S234).

Figure 46:
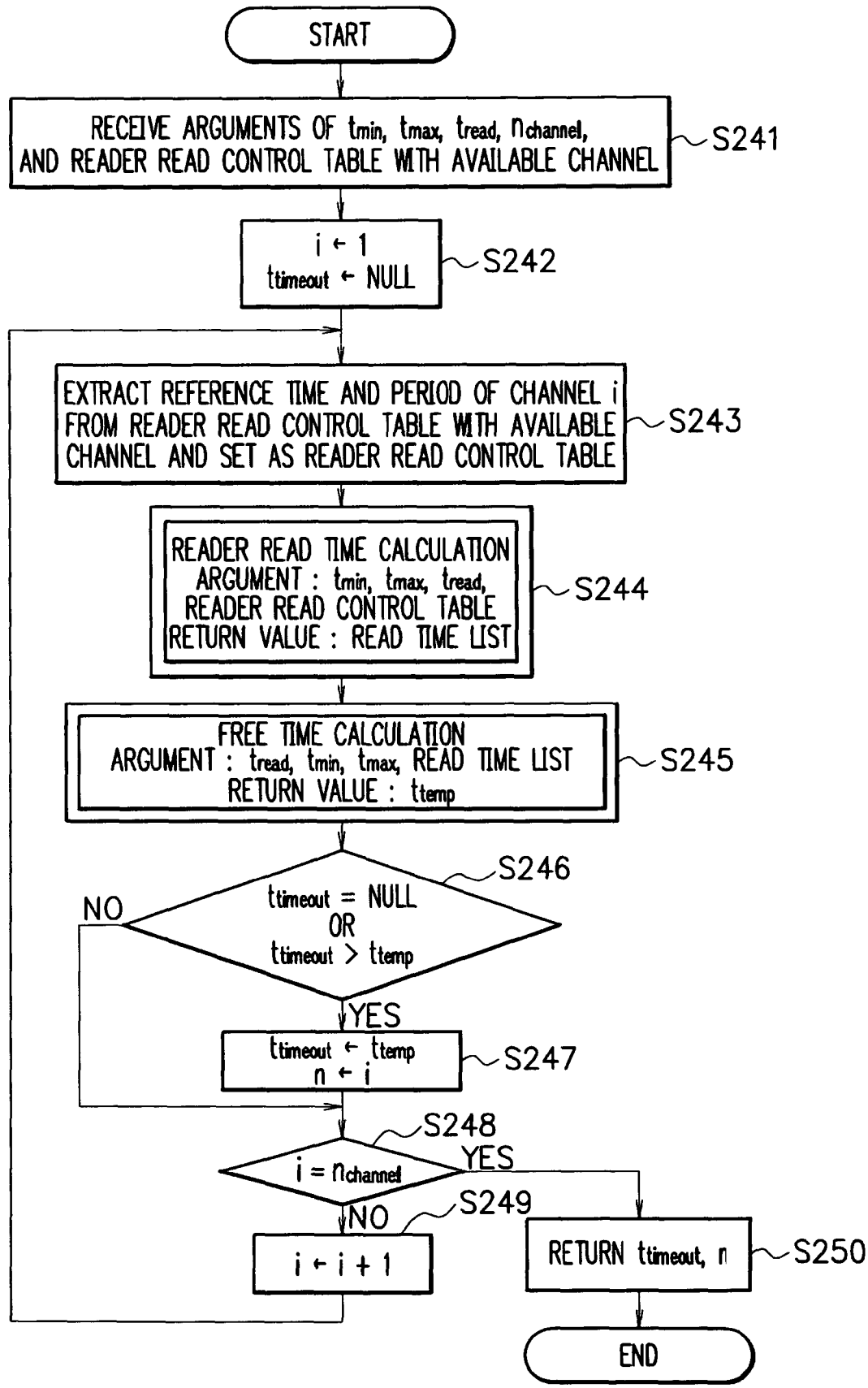
FIG. 46 is a flowchart showing a flow of a time-out time program.
Figures 47, 48:
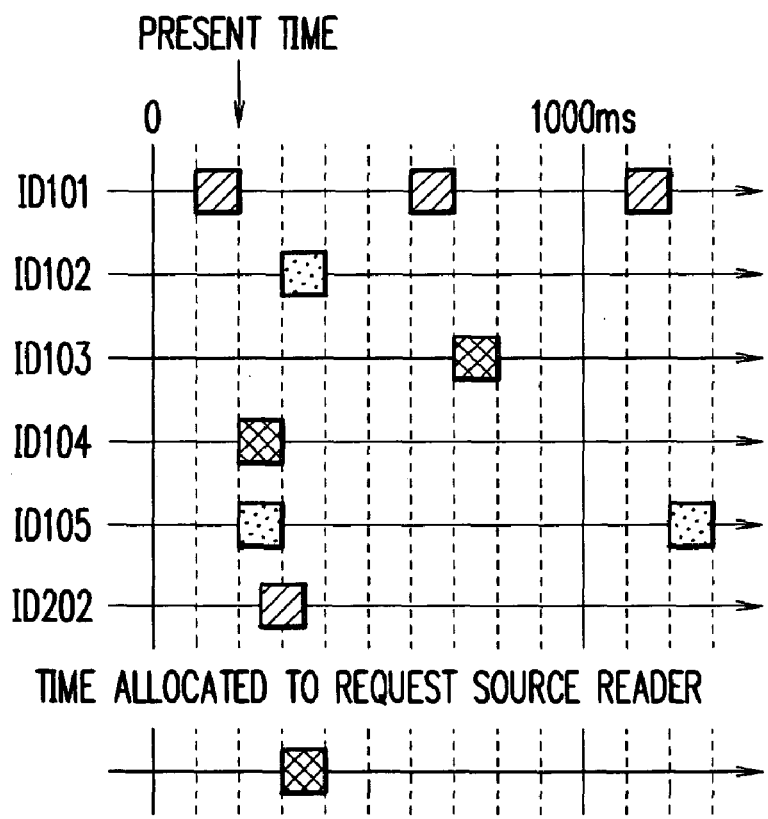
FIG. 47 is a diagram showing an example of an extracted table for channel number i according to the reader read control table with available channel.
FIG. 48 is a flowchart showing a flow of time-out time calculation.

FIG. 46 shows a flow of the time-out time calculation program. The program receives arguments $t_{min}$, $t_{max}$, $t_{read}$, and reader read control table with available channel (step S241). The program assigns "null" to $t_{timeout}$ and sets "1" to i (step S242). Then, the program extracts a table of channel number i from the reader read control table with available channel (step S243). If i is, for example, "1", the table section shown in FIG. 47 is extracted. The program then sequentially calls the reader read time calculation program and the free time calculation program to attain a time-out time "$t_{temp}$" (steps S244 and S245). If $t_{timout}$=null or $t_{timout}>t_{temp}$ (yes in step S246), the program assigns $t_{temp}$ to $t_{timeout}$ (step S247) to extract a table for a subsequent channel (no in step S248; S249, S243) and then executes the above processing (steps S244 and S245). When $t_{temp}$ is assigned to $t_{timeout}$, the associated channel number is set to n (step S247). The program repeatedly executes the processing for all channels. When the processing is finished for all channels (yes in step S248), the program returns $t_{timeout}$ and n (step S250).

FIG. 48 is an example of the time-out time calculation. Assume that the present time $t_{now}$ is 200 ms past relative to a predetermined point of time, $t_{read}$ is 100 ms, $t_{max\_range}$ is 3000 ms, and the parameters of the reader read control table with available channel are as shown in FIG. 45. In this case, the time-out time is attained as 300 ms past the predetermined point of time as shown in FIG. 48 and channel 1 is available. The eleventh embodiment results in an advantage similar to that of the ninth embodiment.

Twelfth Embodiment

A time-out time calculation method other than those of the tenth and eleventh embodiments is described with reference to to the flowchart of FIG. 26. It is assumed in the twelfth embodiment that a plurality of channels are available for the query and reply waves to calculate a nearest point of time at which no interference occurs between the readers. The eleventh embodiment is configured in substantially the same way as for the ninth embodiment.

Figure 49:
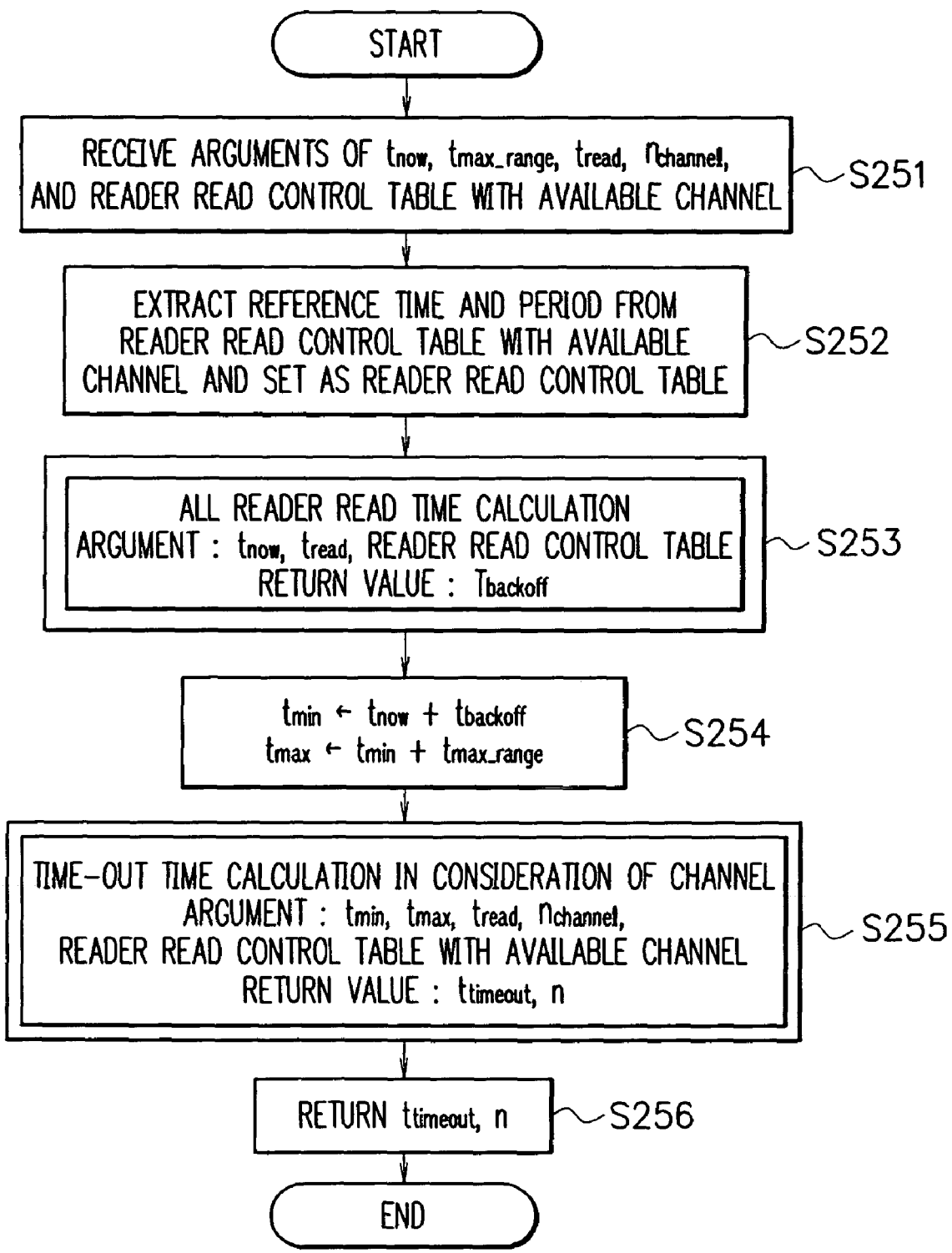
FIG. 49 is a table showing an example of an algorithm of time-out time calculation.
Figures 50, 51:
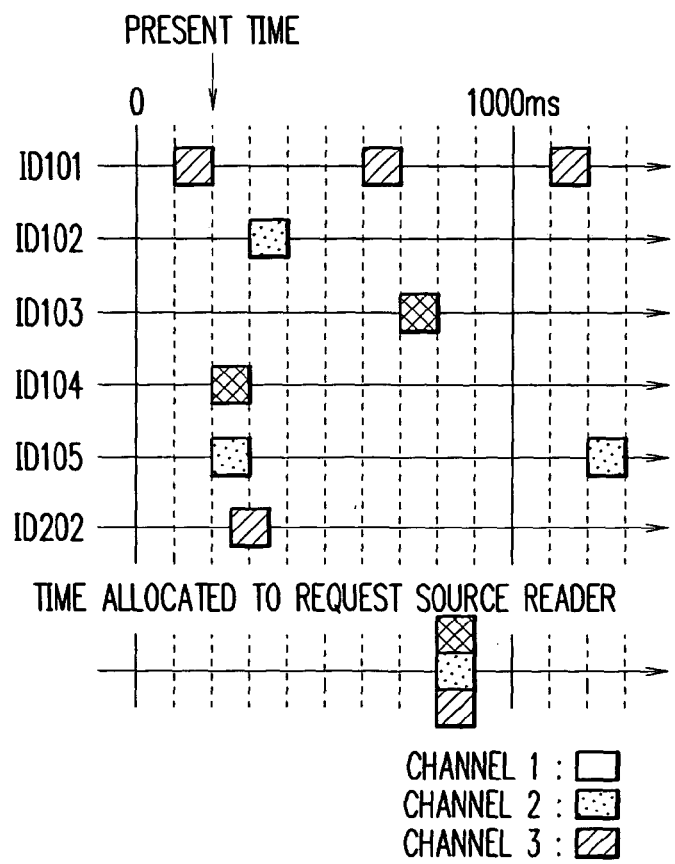
FIG. 50 is a table showing an example of a configuration of the reader read control table with available channel.
FIG. 51 is a flowchart showing a flow of time-out time calculation.

FIG. 49 shows an operation flow of the time-out time calculation program in the twelfth. As in the eleventh embodiment, the program receives arguments $t_{now}$, $t_{max\_range}$, $t_{read}$, and n-channel (step S251). The reader read control table with available channel includes, in addition to the reference time, the period, and the channel, an item of a reader type as shown in FIG. 50. The program first calls, as in the tenth embodiment, an all reader read time calculation program to obtain $t_{backoff}$ (step S253). The program assigns $t_{now}+t_{backoff}$ to $t_{min}$ and $t_{min}+t_{max\_range}$ to $t_{max}$ (step S254). The processing thereafter is almost equal to that of the eleventh embodiment.

FIG. 51 shows an example of the time-out time calculation. Assume that the present time $t_{now}$ is 200 ms from a predetermined point of time, tread is 100 ms, $t_{max\_range}$ is 3000 ms, and "$n_{channel}$" is "3". FIG. 50 shows the parameters of the reader read control table with available channel. In this situation, the time-out time is attained as 800 ms after the predetermined time as shown in FIG. 51. The available channels are channels 1, 2, and 3. All fixed readers finish the read operation when 800 milliseconds lapse relative to the predetermined point of time. After this point of time, a point of time nearest to tnow at which a free time equal to or more than "$t_{read}$" exists for channels 1, 2, and 3 is when 800 milliseconds pass after the predetermined point of time.

The twelfth embodiment results in an advantage similar to that of the tenth embodiment.

Thirteenth Embodiment

In accordance with the thirteenth embodiment of the tag information acquisition system, a mobile reader includes a function as an RF tag to use the function in the system. Excepting the hardware configuration of the mobile reader and the function of the fixed reader to notify acquired tag information to the reader control server, the thirteenth embodiment is almost equal to the ninth embodiment. The mobile reader has a hardware configuration similar to that of the seventh embodiment shown in FIG. 17.

FIG. 52 shows a flow of operation of the reader control server in accordance with the thirteenth embodiment. This includes, in addition to the operation shown in FIG. 26, reader relating processing. Processing of steps S2601 to 2698 is substantially equal to that of steps S111 to S118 shown in FIG. 26. In a case in which a time-out event has not occurred (no in step S2602), if tag information read by the fixed reader is received (yes in step S2609), the reader control server refers to the reader control information (S2610) to classify the received identification into a mobile reader identification or a fixed reader identification (S2611). The data to be referred to is, for example, data shown in FIG. 53. "Reader type" indicates that the reader of the identifier is a fixed reader or a mobile reader. "Nearby mobile reader" stores an identification of the mobile reader acquired from the fixed reader. The program registers the classified mobile reader identification and the fixed reader identification with a relationship established therebetween (step S2612). Assume that the system keeps data shown in FIG. 53. Then, the program obtains, for example, from the fixed reader with an identification of "102" a group of identifications. If the group includes a mobile reader identification "202", the program establishes a relationship between ID 102 and ID 202. The relationship is registered to a reader information database as shown in FIG. 54 (step S2613). Thereafter, if "ID 202" is not attained from the fixed reader with ID 102, the program deletes the identification of the nearby mobile reader corresponding to "ID 102" from the table of FIG. 54 and then the process returns to processing of FIG. 53.

FIG. 55 shows an example of a processing sequence of the thirteenth embodiment. In a case in which the mobile reader is near the fixed reader, when the fixed reader emits a query wave, the mobile reader receives the wave. The wave is delivered via a filter to the reader query wave receiver section. After demodulation of the wave, the resultant signal is fed to the CPU section. The CPU section extracts own reader ID from the storage area and sends the reader ID to the reply wave transmitter section. The transmitter section modulates the reader ID and then transfers the modulated ID to the antenna. In this fashion, the fixed reader attains the ID information of the mobile reader together with information of the RF tag. The fixed reader also sends the obtained ID information to the reader control server. The fixed reader transmits its own identification at the same time.

When an RF tag read instruction is received from the input section, the mobile reader operates in a way similar to that of the ninth embodiment. When a time-out time request is received, the reader control server identifies a fixed reader related to a mobile reader identification of the request. Assume that the identification is "202" as a result of operation to refer to the data shown in FIG. 54. This means that the corresponding fixed reader has an identification of "102". Depending on cases, a plurality of fixed readers corresponds to one mobile reader identification. Next, for the fixed reader identification, the program calculates a time-out time as described in conjunction with the ninth embodiment. However, the time-out time may also be calculated in a method similar to either one of the methods of the tenth, eleventh, and twelfth embodiments.

For each reader of the thirteenth embodiment, it is required to register whether the reader is a mobile reader or a fixed reader. In a case in which the thirteenth embodiment of the tag information acquisition system is installed in a store, the fixed reader is prepared by the store and it is necessary to beforehand register that the reader is a fixed reader. For a mobile reader, in a case in which the mobile reader is lent to the customer, it is necessary to beforehand register that the reader is a mobile reader. If each customer owns a mobile reader, it is possible to register that the reader is a mobile reader, for example, when the customer becomes a member of the store.

The thirteenth embodiment of the tag information acquisition system predicts, for a mobile reader under consideration, nearby fixed readers in the vicinity of the mobile reader. By limiting the number of nearby fixed readers to be taken into consideration in the time-out time calculation, it is possible to calculate earlier read timing, and hence merchandise information can be acquired at an earlier point of time.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An RFID reading method, comprising:
   emitting, from a first RFID reader to an RFID tag, a query wave signal for requesting transmission of information in the RFID tag;
   a second RFID reader receiving the query wave signal while in a standby state, in which a reply wave signal from the RFID tag can not be received;
   the second RFID reader entering a reply wave wait state to wait for the reply wave signal from the RFID tag for a predetermined period of time;
   the second RFID reader receiving, while in the reply wave wait state, a reply wave signal including the information stored in the RFID tag in response to the query wave signal; and
   the second RFID reader returning to the standby state after the predetermined period of time expires.

2. The RFID reading method of claim 1, further comprising the second RFID reader entering the reply wave wait state by receiving a tag read instruction that is input by an operator, or received from an external device communicating with the second RFID reader.

3. The RFID reading method of claim 2, further comprising the second RFID reader checking, at expiration of the predetermined period of time, whether the reply wave signal was received while in the reply wave wait state, then emitting the another query wave signal that requests that the RFID tag transmit the reply wave signal if the reply wave signal having not been received during the reply wave wait state, and returning back to the standby state.

4. The RFID reading method of claim 3, further comprising the second RFID reader emitting the another query wave signal for requesting the RFID tag to transmit the reply wave signal if a predetermined receiving condition of the reply wave signal during the reply wave wait state is not satisfied.

5. An RFID system comprising:
at least one first RFID reader comprising a transmitter that emits a query wave signal to an RFID tag to request information stored in the RFID tag, and a receiver that receives a reply wave signal, which including the information from the RFID tag, in response to the query wave signal; and
at least one second RFID reader that receives the query wave signal, which triggers the at least one second RFID reader to be ready to receive the replay wave signal from the RFID tag in response to the query wave signal,
wherein the second RFID reader comprises a control section that places the RFID reader in:
a) a reply wave wait state, in which the reply wave signal can be received, after receiving the query wave signal, wherein entry to the reply wave wait state begins a predetermined period of time, and
b) a standby state, in which the reply wave signal can not be received, after expiration of the predetermined period of time.

6. The RFID system of claim 5, the second RFID reader further comprising:
an input section for receiving a tag read instruction input by an operator, or an external device of the second RFID reader,
wherein the control section puts the second RFID reader in the reply wave wait state for a predetermined period of time after the input section having receives the tag read instruction.

7. The RFID system of claim 6, wherein the second RFID reader further comprises:
a transmitting section for emitting another query wave signal for requesting the RFID tag to transmit the reply wave signal,
wherein the control section checks whether the reply wave signal having been received during the reply wave wait state after the predetermined period of time has expired and the control section controls the transmitting section to emit the another query wave signal if the reply wave signal has not been received during the reply wave wait state and the control section puts the RFID reader in the standby state.

8. The RFID system of claim 7, wherein the control section controls the transmitting section to emit the another query wave signal if a predetermined receiving condition of the reply wave signal during the reply wave wait state is not satisfied.

9. An RFID reader comprising:
a query wave receiving section for receiving a query wave signal emitted from another RFID reader for that requests transmission of information in an RFID tag from an RFID tag;
a reply wave receiving section for receiving a reply wave signal transmitted from the RFID tag in response to the query wave signal emitted from another RFID reader; and
a control section for controlling a reply wave receiving process in the RFID reader, wherein the control section puts the RFID reader in:
a) a reply wave wait state for a predetermined period of time after receiving the query wave signal, wherein the reply wave receiving section can receive the reply wave signal only during the predetermined period of time and
b) a standby state, in which the reply wave receiving section can not receive the reply wave signal, upon expiration of the predetermined period of time.

10. The RFID reader of claim 9, further comprising:
an input section for receiving a tag read instruction inputted by an operator, or an external device of the RFID reader,
wherein the control section puts the RFID reader in the replay wave wait state for a predetermined period of time after the input section receives the tag read instruction.

11. The RFID reader of claim 10, further comprising:
a transmitting section for emitting another query wave signal for requesting the RFID tag to transmit the reply wave signal;
wherein the control section checks whether the reply wave signal having been received during the reply wave wait state after the predetermined period of time has passed, and the control section controls the transmitting section to emit another query wave signal if the reply wave signal was not received while in the reply wave wait state and then the control section puts the RFID reader into the standby state.

12. The RFID reader of claim 11, wherein the control section controls the transmitting section to emit another query wave signal if a predetermined receiving condition of the reply wave signal while in the reply wave wait state is not satisfied.

* * * * *